US011280898B2

(12) United States Patent
Morton

(10) Patent No.: US 11,280,898 B2
(45) Date of Patent: Mar. 22, 2022

(54) RADAR-BASED BAGGAGE AND PARCEL INSPECTION SYSTEMS

(71) Applicant: Rapiscan Systems, Inc., Torrance, CA (US)

(72) Inventor: Edward James Morton, Guildford (GB)

(73) Assignee: Rapiscan Systems, Inc., Torrance, CA (US)

( * ) Notice: Subject to any disclaimer, the term of this patent is extended or adjusted under 35 U.S.C. 154(b) by 279 days.

(21) Appl. No.: 16/520,786

(22) Filed: Jul. 24, 2019

(65) Prior Publication Data

US 2020/0158860 A1  May 21, 2020

Related U.S. Application Data

(63) Continuation-in-part of application No. 15/859,777, filed on Jan. 2, 2018, now abandoned, which is a continuation of application No. 14/639,956, filed on Mar. 5, 2015, now Pat. No. 9,891,314.

(60) Provisional application No. 62/702,841, filed on Jul. 24, 2018, provisional application No. 62/702,868, filed on Jul. 24, 2018, provisional application No.
(Continued)

(51) Int. Cl.
*G01S 13/88* (2006.01)
*G01S 13/02* (2006.01)
*G01S 13/87* (2006.01)
*G01V 8/00* (2006.01)

(52) U.S. Cl.
CPC ........ *G01S 13/887* (2013.01); *G01S 13/0209* (2013.01); *G01S 13/87* (2013.01); *G01V 8/005* (2013.01)

(58) Field of Classification Search
CPC .... G01S 13/0289; G01S 13/887; G01V 8/005
See application file for complete search history.

(56) References Cited

U.S. PATENT DOCUMENTS 745,140 A     11/1903   Fredrick
1,552,622 A    9/1925   Leslie
(Continued)

FOREIGN PATENT DOCUMENTS

CN    1245295      2/2000
CN    1352919 A    6/2002
(Continued)

OTHER PUBLICATIONS

International Search Report for PCT/US2019/043184, dated Oct. 31, 2019.
(Continued)

*Primary Examiner* — Minh Q Phan
(74) *Attorney, Agent, or Firm* — Novel IP

(57) ABSTRACT

The present specification provides a baggage scanning system including: an aperture defining a scanning tunnel; a conveyor moving through the scanning tunnel, a baggage being scanned moving on the conveyor; a UWB radar array surrounding the aperture for providing radar scan data corresponding to the baggage; a LCMD array positioned at a location around the baggage allowing obtaining of LCMD scan data corresponding to the baggage; and at least a processor for correlating the radar scan data and the LCMD scan data for providing one or more suspicious regions highlighted over a video image of the baggage being scanned.

27 Claims, 9 Drawing Sheets

Related U.S. Application Data

62/702,833, filed on Jul. 24, 2018, provisional application No. 61/949,775, filed on Mar. 7, 2014.

(56)  References Cited

U.S. PATENT DOCUMENTS

| | | |
|---|---|---|
| 3,551,675 A | 12/1970 | Miller, Jr. |
| 3,655,013 A | 4/1972 | Weller |
| 3,655,215 A | 4/1972 | Becklin |
| 3,660,663 A | 5/1972 | Guildford |
| 3,678,278 A | 7/1972 | Peil |
| 3,780,291 A | 12/1973 | Stein |
| 3,790,799 A | 2/1974 | Stein |
| 3,843,881 A | 10/1974 | Barton |
| 3,884,816 A | 5/1975 | Takahashi |
| 3,919,467 A | 11/1975 | Peugeot |
| 3,924,064 A | 12/1975 | Nomura |
| 3,961,186 A | 6/1976 | Leunbach |
| 3,971,948 A | 7/1976 | Pfeiler |
| 3,990,175 A | 11/1976 | Conway |
| 4,008,400 A | 2/1977 | Brunnett |
| 4,020,346 A | 4/1977 | Dennis |
| 4,031,545 A | 6/1977 | Stein |
| 4,047,035 A | 9/1977 | Dennhoven |
| 4,064,440 A | 12/1977 | Roder |
| 4,070,576 A | 1/1978 | Cobb |
| 4,107,532 A | 8/1978 | Macovski |
| 4,112,301 A | 9/1978 | Annis |
| 4,139,771 A | 2/1979 | Dennhoven |
| 4,160,165 A | 7/1979 | Mccombs |
| 4,179,100 A | 12/1979 | Sashin |
| 4,196,352 A | 4/1980 | Berninger |
| 4,200,800 A | 4/1980 | Swift |
| 4,228,353 A | 10/1980 | Johnson |
| 4,228,357 A | 10/1980 | Annis |
| 4,242,583 A | 12/1980 | Annis |
| 4,242,588 A | 12/1980 | Huang |
| 4,260,898 A | 4/1981 | Annis |
| 4,298,800 A | 11/1981 | Goldman |
| 4,303,830 A | 12/1981 | Heinzelmann |
| 4,342,914 A | 8/1982 | Bjorkholm |
| 4,349,739 A | 9/1982 | Annis |
| 4,357,535 A | 11/1982 | Haas |
| 4,366,382 A | 12/1982 | Kotowski |
| 4,366,576 A | 12/1982 | Annis |
| 4,380,817 A | 4/1983 | Harding |
| 4,389,729 A | 6/1983 | Stein |
| 4,414,682 A | 11/1983 | Annis |
| 4,422,177 A | 12/1983 | Mastronardi |
| 4,426,721 A | 1/1984 | Wang |
| 4,454,605 A | 6/1984 | Delucia |
| 4,472,822 A | 9/1984 | Swift |
| 4,503,332 A | 3/1985 | Annis |
| 4,514,691 A | 4/1985 | De |
| 4,525,854 A | 6/1985 | Molbert |
| 4,535,245 A | 8/1985 | Zonneveld |
| 4,549,307 A | 10/1985 | Macovski |
| 4,578,806 A | 3/1986 | Grass |
| 4,586,441 A | 5/1986 | Zekich |
| 4,598,415 A | 7/1986 | Luccio |
| 4,605,898 A | 8/1986 | Savolainen |
| 4,672,837 A | 6/1987 | Cottrell |
| 4,692,937 A | 9/1987 | Sashin |
| 4,711,994 A | 12/1987 | Greenberg |
| 4,736,401 A | 4/1988 | Donges |
| 4,745,631 A | 5/1988 | Paolini |
| 4,756,015 A | 7/1988 | Doenges |
| 4,759,047 A | 7/1988 | Donges |
| 4,768,214 A | 8/1988 | Bjorkholm |
| 4,783,794 A | 11/1988 | Dietrich |
| 4,799,247 A | 1/1989 | Annis |
| 4,807,637 A | 2/1989 | Bjorkholm |
| 4,809,312 A | 2/1989 | Annis |
| 4,817,121 A | 3/1989 | Shimizu |
| 4,819,256 A | 4/1989 | Annis |
| 4,821,023 A | 4/1989 | Parks |
| 4,825,454 A | 4/1989 | Annis |
| 4,839,913 A | 6/1989 | Annis |
| 4,841,555 A | 6/1989 | Doi |
| 4,845,769 A | 7/1989 | Burstein |
| 4,864,142 A | 9/1989 | Gomberg |
| 4,870,670 A | 9/1989 | Geus |
| 4,884,289 A | 11/1989 | Glockmann |
| 4,890,310 A | 12/1989 | Umetani |
| 4,893,015 A | 1/1990 | Kubierschky |
| 4,894,619 A | 1/1990 | Leinonen |
| 4,899,283 A | 2/1990 | Annis |
| 4,906,973 A | 3/1990 | Karbowski |
| 4,961,214 A | 10/1990 | Van |
| 4,974,247 A | 11/1990 | Friddell |
| 4,979,137 A | 12/1990 | Gerstenfeld |
| 4,995,066 A | 2/1991 | Harding |
| 5,007,072 A | 4/1991 | Jenkins |
| 5,022,062 A | 6/1991 | Annis |
| 5,033,073 A | 7/1991 | Friddell |
| 5,038,370 A | 8/1991 | Harding |
| 5,039,981 A | 8/1991 | Rodriguez |
| 5,044,002 A | 8/1991 | Stein |
| 5,047,718 A | 9/1991 | Aittoniemi |
| 5,076,993 A | 12/1991 | Sawa |
| 5,084,619 A | 1/1992 | Pfeiler |
| 5,115,459 A | 5/1992 | Bertozzi |
| 5,120,706 A | 6/1992 | Weeks |
| 5,121,105 A | 6/1992 | Aittoniemi |
| 5,127,030 A | 6/1992 | Annis |
| 5,132,995 A | 7/1992 | Stein |
| 5,149,114 A | 9/1992 | Lewandowski |
| 5,156,270 A | 10/1992 | Kachel |
| 5,179,581 A | 1/1993 | Annis |
| 5,181,234 A | 1/1993 | Smith |
| 5,182,764 A | 1/1993 | Peschmann |
| 5,212,720 A | 5/1993 | Landi |
| 5,224,144 A | 6/1993 | Annis |
| 5,227,800 A | 7/1993 | Huguenin |
| 5,243,693 A | 9/1993 | Maron |
| 5,247,561 A | 9/1993 | Kotowski |
| 5,253,283 A | 10/1993 | Annis |
| 5,260,982 A | 11/1993 | Fujii |
| 5,313,511 A | 5/1994 | Annis |
| 5,367,552 A | 11/1994 | Peschmann |
| 5,394,454 A | 2/1995 | Harding |
| 5,397,986 A | 3/1995 | Conway |
| 5,414,225 A | 5/1995 | Garfinkle |
| 5,420,905 A | 5/1995 | Bertozzi |
| 5,430,787 A | 7/1995 | Norton |
| 5,463,224 A | 10/1995 | Burstein |
| 5,483,569 A | 1/1996 | Annis |
| 5,490,196 A | 2/1996 | Rudich |
| 5,490,218 A | 2/1996 | Krug |
| 5,493,596 A | 2/1996 | Annis |
| 5,503,424 A | 4/1996 | Agopian |
| 5,524,133 A | 6/1996 | Neale |
| 5,528,656 A | 6/1996 | Annis |
| 5,572,121 A | 11/1996 | Beswick |
| 5,579,360 A | 11/1996 | Abdel-Mottaleb |
| 5,590,057 A | 12/1996 | Fletcher |
| 5,600,303 A | 2/1997 | Husseiny |
| 5,600,700 A | 2/1997 | Krug |
| 5,602,893 A | 2/1997 | Harding |
| 5,638,420 A | 6/1997 | Armistead |
| 5,642,393 A * | 6/1997 | Krug .................. G01V 5/0016 376/159 |
| 5,642,394 A | 6/1997 | Rothschild |
| 5,660,549 A | 8/1997 | Witt |
| 5,666,393 A | 9/1997 | Annis |
| 5,692,028 A | 11/1997 | Geus |
| 5,692,029 A | 11/1997 | Husseiny |
| 5,696,806 A | 12/1997 | Grodzins |
| 5,699,400 A | 12/1997 | Lee |
| 5,763,886 A | 6/1998 | Schulte |
| 5,764,683 A | 6/1998 | Swift |
| 5,790,685 A | 8/1998 | Sallee |
| 5,796,110 A | 8/1998 | An |
| 5,838,758 A | 11/1998 | Krug |
| 5,882,206 A | 3/1999 | Gillio |

(56) References Cited

U.S. PATENT DOCUMENTS

| | | |
|---|---|---|
| 5,892,840 A | 4/1999 | Jang |
| 5,910,973 A | 6/1999 | Grodzins |
| 5,930,326 A | 7/1999 | Rothschild |
| 5,940,468 A | 8/1999 | Huang |
| 5,966,422 A | 10/1999 | Dafni |
| 5,974,111 A | 10/1999 | Krug |
| 6,018,562 A | 1/2000 | Willson |
| 6,044,353 A | 3/2000 | Pugliese |
| 6,057,761 A | 5/2000 | Yukl |
| 6,081,580 A | 6/2000 | Grodzins |
| 6,094,472 A | 7/2000 | Smith |
| 6,137,895 A | 10/2000 | Al-Sheikh |
| 6,138,815 A | 10/2000 | Reiners |
| 6,151,381 A | 11/2000 | Grodzins |
| 6,192,104 B1 | 2/2001 | Adams |
| 6,212,251 B1 | 4/2001 | Tomura |
| 6,236,709 B1 | 5/2001 | Perry |
| 6,249,567 B1 | 6/2001 | Rothschild |
| 6,269,142 B1 | 7/2001 | Smith |
| 6,272,206 B1 | 8/2001 | Bjorkholm |
| 6,278,115 B1 | 8/2001 | Annis |
| 6,282,260 B1 | 8/2001 | Grodzins |
| 6,282,264 B1 | 8/2001 | Smith |
| 6,292,533 B1 | 9/2001 | Swift |
| 6,298,603 B1 | 10/2001 | Diaz |
| 6,301,326 B2 | 10/2001 | Bjorkholm |
| 6,301,327 B1 | 10/2001 | Martens |
| 6,308,644 B1 | 10/2001 | Diaz |
| 6,315,308 B1 | 11/2001 | Konopka |
| RE37,467 E | 12/2001 | Brasch |
| 6,356,620 B1 | 3/2002 | Rothschild |
| 6,366,203 B1 | 4/2002 | Burns |
| 6,370,222 B1 | 4/2002 | Cornick |
| 6,375,697 B2 | 4/2002 | Davies |
| 6,393,095 B1 | 5/2002 | Robinson |
| 6,418,194 B1 | 7/2002 | Mcpherson |
| 6,421,420 B1 | 7/2002 | Grodzins |
| 6,424,695 B1 | 7/2002 | Grodzins |
| 6,434,219 B1 | 8/2002 | Rothschild |
| 6,442,233 B1 | 8/2002 | Grodzins |
| 6,453,007 B2 | 9/2002 | Adams |
| 6,459,761 B1 | 10/2002 | Grodzins |
| 6,459,764 B1 | 10/2002 | Chalmers |
| 6,472,984 B1 | 10/2002 | Risi |
| 6,473,487 B1 | 10/2002 | Le |
| 6,484,650 B1 | 11/2002 | Stomski |
| 6,507,278 B1 | 1/2003 | Brunetti |
| 6,540,064 B1 | 4/2003 | Bodewes |
| 6,542,574 B2 | 4/2003 | Grodzins |
| 6,543,599 B2 | 4/2003 | Jasinetzky |
| 6,546,072 B1 | 4/2003 | Chalmers |
| 6,552,346 B2 | 4/2003 | Verbinski |
| 6,553,096 B1 | 4/2003 | Zhou |
| 6,556,653 B2 | 4/2003 | Hussein |
| 6,567,496 B1 | 5/2003 | Sychev |
| 6,597,760 B2 | 7/2003 | Beneke |
| 6,610,977 B2 | 8/2003 | Megerle |
| 6,621,888 B2 | 9/2003 | Grodzins |
| 6,628,745 B1 | 9/2003 | Annis |
| 6,634,668 B2 | 10/2003 | Urffer |
| 6,653,588 B1 | 11/2003 | Gillard-Hickman |
| 6,665,373 B1 | 12/2003 | Kotowski |
| 6,674,367 B2 | 1/2004 | Sweatte |
| 6,707,879 B2 | 3/2004 | Mcclelland |
| 6,721,391 B2 | 4/2004 | Mcclelland |
| 6,742,301 B1 | 6/2004 | Schwarz |
| 6,745,520 B2 | 6/2004 | Puskaric |
| 6,749,207 B2 | 6/2004 | Nadeau |
| 6,754,304 B1 | 6/2004 | Kumakhov |
| 6,777,684 B1 | 8/2004 | Volkov |
| 6,785,357 B2 | 8/2004 | Bernardi |
| 6,785,360 B1 | 8/2004 | Annis |
| 6,819,109 B2 | 11/2004 | Sowers |
| 6,819,241 B2 | 11/2004 | Turner |
| 6,831,603 B2 | 12/2004 | Menache |
| 6,839,403 B1 | 1/2005 | Kotowski |
| 6,848,826 B2 | 2/2005 | Marie |
| 6,856,667 B2 | 2/2005 | Ellenbogen |
| 6,870,791 B1 | 3/2005 | Caulfield |
| 6,876,719 B2 | 4/2005 | Ozaki |
| 6,879,657 B2 | 4/2005 | Hoffman |
| 6,891,381 B2 | 5/2005 | Bailey |
| 6,899,540 B1 | 5/2005 | Neiderman |
| 6,900,727 B2 | 5/2005 | Lee |
| 6,901,346 B2 | 5/2005 | Tracy |
| 6,911,907 B2 | 6/2005 | Kelliher |
| 6,920,197 B2 | 7/2005 | Kang |
| 6,952,163 B2 | 10/2005 | Huey |
| 6,965,340 B1 | 11/2005 | Baharav |
| 6,967,612 B1 | 11/2005 | Gorman |
| 6,970,086 B2 | 11/2005 | Nelson |
| 6,970,087 B2 | 11/2005 | Stis |
| 6,980,623 B2 | 12/2005 | Dunham |
| 6,990,175 B2 | 1/2006 | Nakashima |
| 7,016,459 B2 | 3/2006 | Ellenbogen |
| 7,016,473 B1 | 3/2006 | Linev |
| 7,053,785 B2 | 5/2006 | Akins |
| 7,092,485 B2 | 8/2006 | Kravis |
| 7,099,434 B2 | 8/2006 | Adams |
| 7,102,512 B2 | 9/2006 | Pendergraft |
| 7,103,137 B2 | 9/2006 | Seppi |
| 7,110,493 B1 | 9/2006 | Kotowski |
| 7,110,925 B2 | 9/2006 | Pendergraft |
| 7,114,849 B2 | 10/2006 | Atzinger |
| 7,142,638 B2 | 11/2006 | Polichar |
| 7,143,004 B2 | 11/2006 | Townsend |
| 7,162,005 B2 | 1/2007 | Bjorkholm |
| 7,164,747 B2 | 1/2007 | Ellenbogen |
| 7,185,206 B2 | 2/2007 | Goldstein |
| 7,203,276 B2 | 4/2007 | Arsenault |
| 7,207,713 B2 | 4/2007 | Lowman |
| 7,218,704 B1 | 5/2007 | Adams |
| 7,257,189 B2 | 8/2007 | Modica |
| 7,263,409 B2 | 8/2007 | Levasseur |
| 7,265,709 B2 | 9/2007 | Fleisher |
| 7,286,634 B2 | 10/2007 | Sommer |
| 7,305,062 B2 | 12/2007 | Hambuechen |
| 7,305,063 B2 | 12/2007 | Heuscher |
| 7,317,390 B2 | 1/2008 | Huey |
| 7,322,745 B2 | 1/2008 | Agrawal |
| 7,330,529 B2 | 2/2008 | Kautzer |
| 7,333,587 B2 | 2/2008 | De |
| 7,356,115 B2 | 4/2008 | Ford |
| 7,365,672 B2 | 4/2008 | Keller |
| 7,400,701 B1 | 7/2008 | Cason |
| 7,418,077 B2 | 8/2008 | Gray |
| 7,460,636 B2 | 12/2008 | Ein-Gal |
| 7,471,764 B2 | 12/2008 | Kaval |
| 7,476,023 B1 | 1/2009 | Canfield |
| 7,505,556 B2 | 3/2009 | Chalmers |
| 7,505,557 B2 | 3/2009 | Modica |
| 7,505,562 B2 | 3/2009 | Dinca |
| 7,551,709 B2 | 6/2009 | Schlomka |
| 7,551,715 B2 | 6/2009 | Rothschild |
| 7,555,099 B2 | 6/2009 | Rothschild |
| 7,558,370 B2 | 7/2009 | Sommer |
| 7,561,666 B2 | 7/2009 | Annis |
| 7,577,234 B2 | 8/2009 | Knoespel |
| 7,593,506 B2 | 9/2009 | Cason |
| 7,593,510 B2 | 9/2009 | Rothschild |
| 7,595,638 B2 | 9/2009 | Crowley |
| 7,633,518 B2 | 12/2009 | Beevor |
| 7,639,866 B2 | 12/2009 | Pomero |
| 7,659,851 B2 | 2/2010 | Dejean |
| 7,660,388 B2 | 2/2010 | Gray |
| 7,671,784 B2 | 3/2010 | Steinway |
| 7,684,544 B2 | 3/2010 | Wilson |
| 7,783,004 B2 | 8/2010 | Kotowski |
| 7,796,394 B2 | 9/2010 | Wang |
| 7,796,733 B2 | 9/2010 | Hughes |
| 7,796,734 B2 | 9/2010 | Mastronardi |
| 7,806,589 B2 | 10/2010 | Tashman |
| 7,809,109 B2 | 10/2010 | Mastronardi |
| 7,817,776 B2 | 10/2010 | Agrawal |

(56) References Cited

U.S. PATENT DOCUMENTS

| | | |
|---|---|---|
| 7,826,589 B2 | 11/2010 | Kotowski |
| 7,984,940 B2 | 7/2011 | Chen |
| 8,003,949 B2 | 8/2011 | Ryge |
| 8,023,726 B2 | 9/2011 | Sundaresan |
| 8,054,938 B2 | 11/2011 | Kaval |
| 8,061,599 B2 | 11/2011 | Daly |
| 8,113,071 B2 | 2/2012 | Sagi-Dolev |
| 8,116,575 B1 | 2/2012 | Saisan |
| 8,135,112 B2 | 3/2012 | Hughes |
| 8,194,822 B2 | 6/2012 | Rothschild |
| 8,199,996 B2 | 6/2012 | Hughes |
| 8,275,092 B1 | 9/2012 | Zhang |
| 8,275,093 B2 | 9/2012 | Rothschild |
| 8,325,871 B2 | 12/2012 | Grodzins |
| 8,442,186 B2 | 5/2013 | Rothschild |
| 8,552,722 B2 | 10/2013 | Lionheart |
| 8,576,982 B2 | 11/2013 | Gray |
| 8,576,989 B2 | 11/2013 | Kaminski |
| 8,605,859 B2 | 12/2013 | Mastronardi |
| 8,638,904 B2 | 1/2014 | Gray |
| 8,654,922 B2 | 2/2014 | Bendahan |
| 8,731,137 B2 | 5/2014 | Arroyo |
| 8,995,619 B2 | 3/2015 | Gray |
| 9,020,100 B2 | 4/2015 | Mastronardi |
| 9,282,258 B2 | 3/2016 | Kuznetsov |
| 9,535,019 B1 | 1/2017 | Rothschild |
| 9,714,920 B2 | 7/2017 | Lionheart |
| 9,891,314 B2 | 2/2018 | Morton |
| 10,107,783 B2 | 10/2018 | Lionheart |
| 2001/0021241 A1 | 9/2001 | Swift |
| 2002/0045152 A1 | 4/2002 | Viscardi |
| 2002/0136353 A1 | 9/2002 | Kang |
| 2003/0012338 A1 | 1/2003 | Lienard |
| 2003/0025302 A1 | 2/2003 | Urffer |
| 2003/0080868 A1 | 5/2003 | Nelson |
| 2003/0171939 A1 | 9/2003 | Yagesh |
| 2003/0204361 A1 | 10/2003 | Townsend |
| 2003/0214407 A1 | 11/2003 | Sweatte |
| 2003/0225612 A1 | 12/2003 | Desimone |
| 2003/0229506 A1 | 12/2003 | Scott |
| 2004/0000999 A1 | 1/2004 | Turner |
| 2004/0012494 A1 | 1/2004 | Lee |
| 2004/0017313 A1 | 1/2004 | Menache |
| 2004/0051265 A1 | 3/2004 | Nadeau |
| 2004/0080315 A1 | 4/2004 | Beevor |
| 2004/0088584 A1 | 5/2004 | Shachar |
| 2004/0090359 A1 | 5/2004 | Mcmakin |
| 2004/0109532 A1 | 6/2004 | Ford |
| 2004/0120454 A1 | 6/2004 | Ellenbogen |
| 2004/0125914 A1 | 7/2004 | Kang |
| 2004/0175018 A1 | 9/2004 | Macarthur |
| 2004/0252024 A1 | 12/2004 | Huey |
| 2005/0024199 A1 | 2/2005 | Huey |
| 2005/0031069 A1 | 2/2005 | Kaucic |
| 2005/0074086 A1 | 4/2005 | Pendergraft |
| 2005/0100135 A1 | 5/2005 | Lowman |
| 2005/0276379 A1 | 12/2005 | Polichar |
| 2006/0109174 A1 | 5/2006 | Baharav |
| 2006/0182223 A1 | 8/2006 | Heuscher |
| 2006/0214835 A1 | 9/2006 | Lee |
| 2006/0262902 A1 | 11/2006 | Wattenburg |
| 2007/0009088 A1 | 1/2007 | Edic |
| 2007/0058037 A1 | 3/2007 | Bergeron |
| 2007/0086564 A1 | 4/2007 | Bruder |
| 2007/0098142 A1 | 5/2007 | Rothschild |
| 2007/0139248 A1 | 6/2007 | Baharav |
| 2007/0159400 A1 | 7/2007 | Dejean |
| 2007/0172026 A1 | 7/2007 | Schlomka |
| 2007/0235652 A1 | 10/2007 | Smith |
| 2008/0054893 A1 | 3/2008 | Humphreys |
| 2008/0088345 A1 | 4/2008 | Whetsel |
| 2008/0144777 A1 | 6/2008 | Wilson |
| 2008/0212742 A1 | 9/2008 | Hughes |
| 2008/0303708 A1 | 12/2008 | Daly |
| 2009/0041186 A1 | 2/2009 | Gray |
| 2009/0073023 A1 | 3/2009 | Ammar |
| 2009/0074138 A1 | 3/2009 | Knoespel |
| 2009/0075325 A1 | 3/2009 | Das |
| 2009/0082762 A1 | 3/2009 | Ormsby |
| 2009/0103686 A1 | 4/2009 | Rothschild |
| 2009/0116614 A1 | 5/2009 | Kotowski |
| 2009/0116617 A1 | 5/2009 | Mastronardi |
| 2009/0167042 A1 | 7/2009 | Chen |
| 2009/0232353 A1 | 9/2009 | Sundaresan |
| 2009/0245462 A1 | 10/2009 | Agrawal |
| 2009/0252295 A1 | 10/2009 | Foland |
| 2009/0257555 A1 | 10/2009 | Chalmers |
| 2009/0278683 A1 | 11/2009 | Carter |
| 2010/0034451 A1 | 2/2010 | Hughes |
| 2010/0067654 A1 | 3/2010 | Kotowski |
| 2010/0158191 A1 | 6/2010 | Gray |
| 2011/0017917 A1 | 1/2011 | Mastronardi |
| 2011/0080999 A1 | 4/2011 | Kaval |
| 2011/0081099 A1 | 4/2011 | Hughes |
| 2011/0096901 A1 | 4/2011 | Kotowski |
| 2011/0102235 A1 | 5/2011 | Abdillah |
| 2011/0129063 A1 | 6/2011 | Bendahan |
| 2011/0164726 A1 | 7/2011 | Mastronardi |
| 2011/0234783 A1 | 9/2011 | Uemura |
| 2011/0273320 A1 | 11/2011 | Nogueira-Nine |
| 2011/0274249 A1 | 11/2011 | Gray |
| 2011/0274250 A1 | 11/2011 | Gray |
| 2011/0293072 A1 | 12/2011 | Kaminski |
| 2011/0299659 A1 | 12/2011 | Gray |
| 2012/0038666 A1 | 2/2012 | Evers |
| 2012/0103061 A1 | 5/2012 | Nacson |
| 2012/0311939 A1 | 12/2012 | Barragan Olaya |
| 2013/0006552 A1 | 1/2013 | Peyton |
| 2014/0028457 A1 | 1/2014 | Reinpoldt |
| 2014/0063239 A1 | 3/2014 | Furness |
| 2014/0185755 A1 | 7/2014 | Bendahan |
| 2014/0339430 A1 | 11/2014 | Hillis |
| 2015/0186732 A1 | 7/2015 | Perron |
| 2016/0116581 A1 | 4/2016 | Mohamadi |
| 2019/0004170 A1 | 1/2019 | Morton |

FOREIGN PATENT DOCUMENTS

| | | |
|---|---|---|
| CN | 1490616 | 4/2004 |
| CN | 1674204 A | 9/2005 |
| CN | 1715895 | 1/2006 |
| CN | 1715895 A | 1/2006 |
| CN | 1732850 A | 2/2006 |
| CN | 1764987 | 4/2006 |
| CN | 1764987 A | 4/2006 |
| CN | 1779442 A | 5/2006 |
| CN | 1802676 | 7/2006 |
| CN | 1846151 | 10/2006 |
| CN | 100593732 C | 11/2006 |
| CN | 101083757 | 12/2007 |
| CN | 101379415 | 3/2009 |
| CN | 101644687 | 2/2010 |
| CN | 101644687 A | 2/2010 |
| CN | 101071109 | 5/2010 |
| CN | 101467071 | 6/2012 |
| CN | 101185006 | 1/2013 |
| DE | 3141755 A1 | 7/1982 |
| DE | 19907758 A1 | 8/1999 |
| EP | 0261984 A2 | 3/1988 |
| EP | 0533316 | 3/1993 |
| EP | 1635169 A1 | 3/2006 |
| EP | 1772874 A2 | 4/2007 |
| EP | 2520927 A1 | 11/2012 |
| EP | 2548011 | 1/2013 |
| EP | 2548012 | 1/2013 |
| EP | 3114464 | 1/2017 |
| GB | 1283915 A | 8/1972 |
| JP | S61190877 | 8/1986 |
| JP | H4313052 | 11/1992 |
| JP | H6265485 | 9/1994 |
| JP | H10185842 | 7/1998 |
| JP | 2004150822 | 5/2004 |
| JP | 2004251624 | 9/2004 |
| JP | 2005501262 | 1/2005 |

(56) References Cited

FOREIGN PATENT DOCUMENTS

| JP | 2007163474 | | 6/2007 |
|---|---|---|---|
| JP | 2007517275 | | 6/2007 |
| JP | 2007532876 | | 11/2007 |
| JP | 2010008272 | | 1/2010 |
| JP | 2012524921 | | 10/2012 |
| JP | 2014029663 | | 2/2014 |
| WO | 1988000698 | | 1/1988 |
| WO | 9202937 | A1 | 2/1992 |
| WO | 1992002937 | | 2/1992 |
| WO | 9701771 | A | 1/1997 |
| WO | 1999021148 | | 4/1999 |
| WO | 0105685 | A2 | 1/2001 |
| WO | 03048808 | A | 6/2003 |
| WO | 03048815 | | 6/2003 |
| WO | 2004097456 | A | 11/2004 |
| WO | 2004111963 | A1 | 12/2004 |
| WO | 2005098400 | | 10/2005 |
| WO | 2006027122 | A1 | 3/2006 |
| WO | 2009006044 | | 1/2009 |
| WO | 2009082762 | A1 | 7/2009 |
| WO | 2009148637 | | 12/2009 |
| WO | 2010032003 | A1 | 3/2010 |
| WO | 2011063059 | | 5/2011 |
| WO | 2011106745 | | 9/2011 |
| WO | 2011115923 | A1 | 9/2011 |
| WO | 2011115930 | A2 | 9/2011 |
| WO | 2011115934 | A2 | 9/2011 |
| WO | 2011115935 | A1 | 9/2011 |
| WO | 2013006373 | | 1/2013 |
| WO | 2013011282 | | 1/2013 |
| WO | 2014058495 | | 4/2014 |
| WO | 2015134802 | | 9/2015 |
| WO | 2020023603 | A1 | 1/2020 |

OTHER PUBLICATIONS

Written Opinion of the International Searching Authority for PCT/US2019/043184, dated Oct. 31, 2019.
International Search Report for PCT/US2008/067619, Rapiscan Security Products., dated Aug. 20, 2008.
International Search Report for PCT/US2008/088345, Rapiscan Security Products., dated Apr. 3, 2009.
Gerald J. Smith, 'Bodysearch Technology Uses X-ray Imaging to Remove Hazards and Humiliation from Personnel Searches', IEEE, 1995.
ANSI, Radiation Safety for Personnel Security Screening Systems Using X-Rays, Apr. 3, 2002.
Murray et al., 'Exploitation of X-Ray Technology for the Detection of Contraband-Aviation Security Applications', European Conference on Security and Detection, Apr. 28-30, 1997.
International Search Report, PCT/US11/28411, dated Sep. 27, 2011, Rapiscan Systems Inc.
International Search Report, PCT/US11/28393, dated Jul. 8, 2011, Rapiscan Systems Inc.
International Search Report, PCT/US11/28413, dated Jul. 22, 2011, Rapiscan Systems Inc.
CRS Report for Congress, Aviation Security Technologies and Procedures: Screening Passengers and Baggage, Oct. 26, 2001, pp. 1-12.
International Search Report, PCT/US11/28403, dated Oct. 11, 2011, Rapiscan Systems Inc.
International Search Report for PCT/US06/00623, dated Feb. 27, 2008, International Search Authority, pp. 12-13 of the report analyzes the materiality of certain references.
Rapiscan Security Products, Secure 1000 Concealed Object Detection System, Nov. 1998.
Rapiscan Security Products, Secure 1000 Brochure, 2002.
Daniel Strom, "Screening Individuals with Backscatter X-Ray Systems", Health Physics Society, Feb. 3, 2005.
Rapiscan Systems Secure 1000 Case Study, London Heathrow Terminal 4, Fall 2004.
MSNBC, "Airports Seek Hi-Tech Security", Apr. 3, 2002.
St. Bartholomew's Hospital, Radiation Safety Report on the Rapiscan Secure 1000 X-Ray System, Nov. 4, 2004.
International Search Report, PCT/US2008/067619, dated Aug. 20, 2008, Rapiscan Security Products.
International Search Report for PCT/US15/19049, dated Jun. 17, 2015.
International Search Report for PCT/US13/50559, dated Mar. 27, 2014.
International Search Report PCT/GB2008/000116, dated Nov. 17, 2009.
International Search Report for PCT/US2011/026382, dated Jun. 30, 2011, Rapiscan Systems.
Interational Search Report for PCT/US2012/044632, dated Oct. 26, 2012, Rapiscan Systems.
International Search Report for PCT/US2010/057123, dated Mar. 22, 2011, Rapiscan Systems.

* cited by examiner

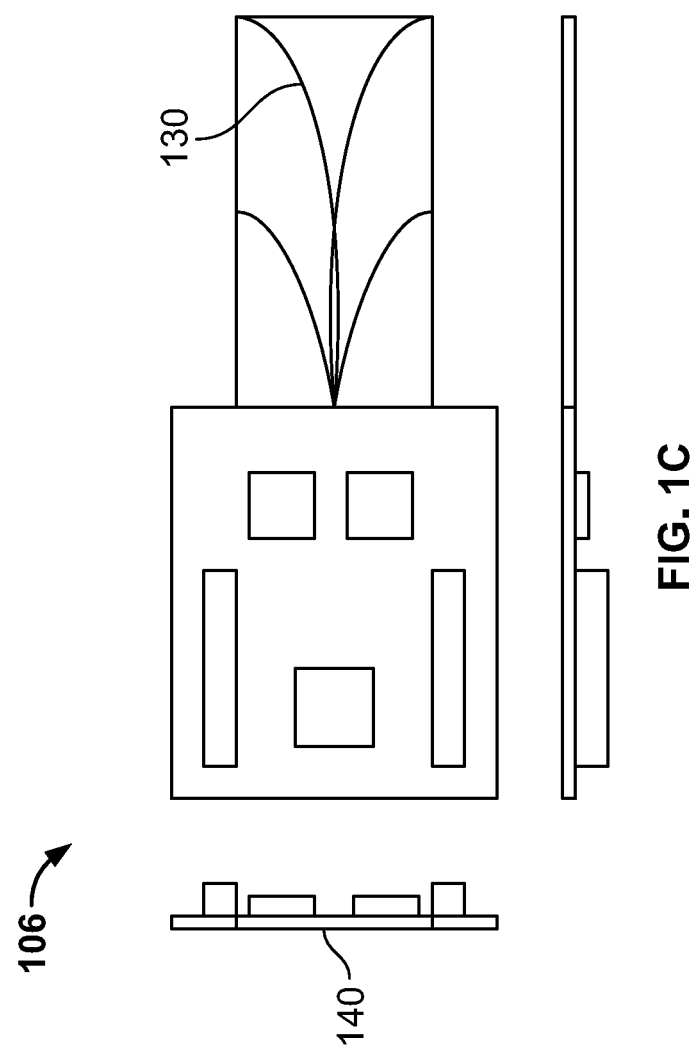

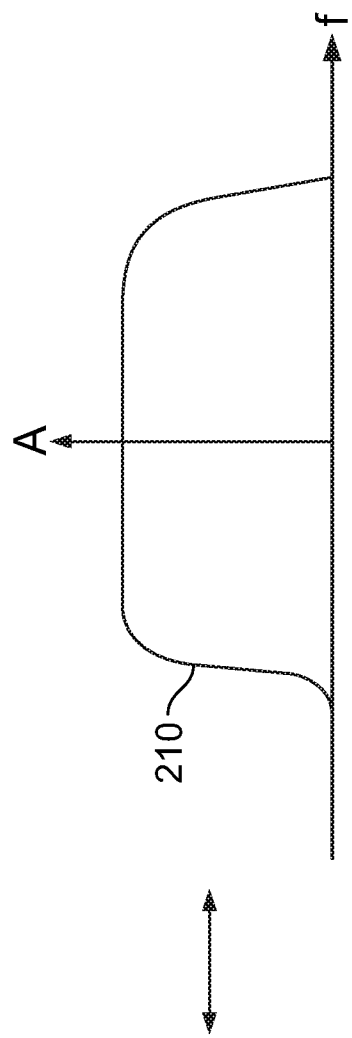
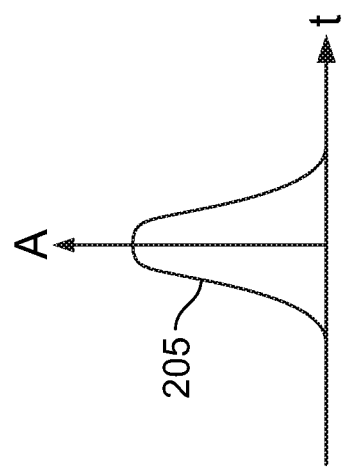
FIG. 2

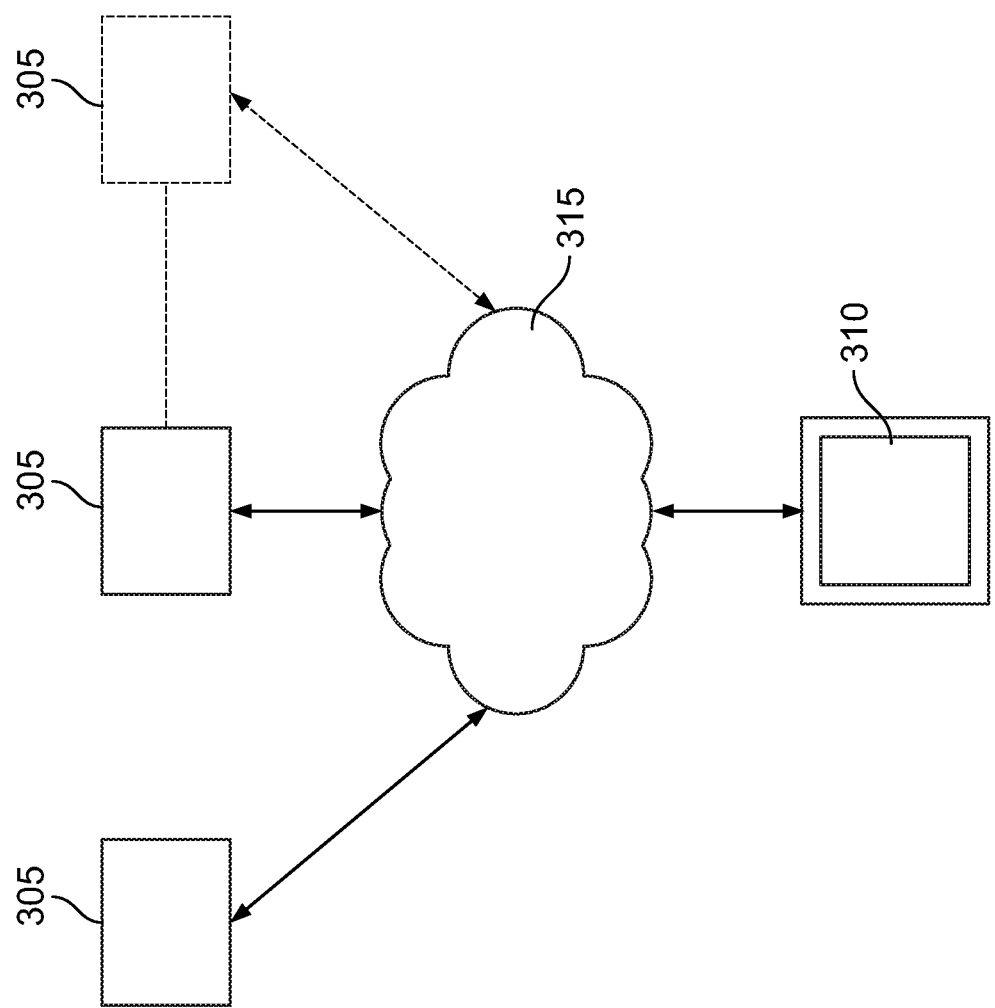

_US 11,280,898 B2_

RADAR-BASED BAGGAGE AND PARCEL INSPECTION SYSTEMS

CROSS-REFERENCE

The present application relies on U.S. Patent Provisional Application No. 62/702,833, entitled "Passive, Walk-Through Metal Detection System" and filed on Jul. 24, 2018, for priority.

The present application also relies on U.S. Patent Provisional Application No. 62/702,841 entitled "Radar-Based Inspection System" and filed on Jul. 24, 2018, for priority.

The present application also relies on U.S. Patent Provisional Application No. 62/702,868 entitled "Radar-Based Baggage and Parcel Inspection Systems" and filed on Jul. 24, 2018, for priority.

The present specification is also a continuation-in-part application of U.S. patent application Ser. No. 15/859,777, entitled "Ultra Wide Band Detectors", filed on Jan. 2, 2018, which in turn, is a continuation application of U.S. patent application Ser. No. 14/639,956, entitled "Ultra Wide Band Detectors", filed on Mar. 5, 2015, and issued as U.S. Pat. No. 9,891,314 on Feb. 13, 2018, which, in turn, relies on U.S. Patent Provisional No. 61/949,775, entitled "Ultra-Wide Band Detectors", and filed on Mar. 7, 2014, for priority.

The present application relates to U.S. patent application Ser. No. 15/625,925, entitled "Detector Systems", filed on Jun. 16, 2017, and issued as U.S. Pat. No. 10,107,783 on Oct. 23, 2018, which is a continuation application of U.S. patent application Ser. No. 14/020,317, of the same title, filed on Sep. 6, 2013, and issued as U.S. Pat. No. 9,714,920 on Jul. 25, 2017, which is a continuation application of U.S. patent application Ser. No. 12/523,051, of the same title, filed on Jul. 13, 2009, and issued as U.S. Pat. No. 8,552,722 on Oct. 8, 2013, which is a national stage application of PCT Application No. PCT/GB2008/000116, filed on Jan. 15, 2008, which relies on Great Britain Patent Application Number 0703481.2, filed on Feb. 22, 2007 and Great Britain Patent Application Number 0700731.3, filed on Jan. 15, 2007, for priority.

All of the above-mentioned patents and patent applications are herein incorporated by reference in their entirety.

FIELD

The present specification generally relates to baggage screening systems, and in particular, relates to systems for material-specific detection using non-ionizing radiation and metal detectors.

BACKGROUND

Terrorism is a threat to the public especially in crowded locations. Threat devices, such as weapons, or threat materials, such as explosives, may be carried in hand baggage with little probability of detection by casual, or even skilled, observers. Therefore, it has become common practice to require travelers to divest themselves of their hand baggage when entering or passing through a critical facility such as an airport, train depot, or public building. The baggage is then searched either manually, or via X-ray scanning systems to produce images of the baggage being scanned. Currently, known technologies require a trained algorithm to analyze the shape of detected threat objects in the scanned images to determine if it is a threat or if it is innocuous. From the shape alone, however, it is difficult to assess the nature of many potential threats, or ascertain whether they are indeed innocuous items, and therefore false alarm rates tend to be significant.

In order to reduce baggage scan time and make the searching of baggage efficient, there is a need to separate personnel screening systems from baggage screening systems, so that successful baggage screening can be achieved with low cost, widely deployable, sensors that do not pose any health risk to the general population.

Hence, there is need for a low cost, zero health hazard, carry-on baggage scanning system for use with relatively untrained operators for directed search on a fraction of scanned bags, based on large potential threat items. There is also need for a baggage scanning system that may be deployed in potentially high threat areas such as, but not limited to, critical infrastructure, special events, crowded areas such as shopping malls and the aviation sector.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a baggage scanning system comprising: an aperture defining a scanning tunnel; a conveyor configured to move baggage through the scanning tunnel; a radar array distributed around the aperture, the radar array comprising a plurality of radar sub-systems for providing radar scan data comprising location and dielectric properties of a threat object in the baggage; a metal detection system comprising: at least a plurality of magnetic field generators and a plurality of magnetic field detectors positioned respectively at least on two opposing sides of the aperture; and a processor configured to cause a magnetic field to be generated in the aperture via the magnetic field generators, configured to receive data from the plurality of magnetic field detectors and configured to determine values indicative of a magnetic field modified by the baggage passing through the aperture in order to generate metal detector scan data; and at least one processor configured to correlate the radar scan data and the metal detector scan data and to determine one or more regions of the baggage requiring further inspection.

Optionally, the baggage scanning system further comprises a video camera system positioned within the aperture and configured to generate surface profile data. Optionally, the at least one processor is configured to use the surface profile data, radar scan data and metal detector scan data to highlight the one or more regions over an image of the baggage being scanned.

Optionally, the metal detector scan data comprises localization and characterization data of objects present in the baggage.

Optionally, the plurality of magnetic field generators and the plurality of magnetic field detectors are positioned on a top of the aperture and on a bottom of the aperture.

Optionally, the plurality of magnetic field generators and the plurality of magnetic field detectors are positioned below the conveyor.

Optionally, the radar sub-system comprises at least a Vivaldi antenna coupled with an electronics drive circuit.

Optionally, the radar sub-system is operated in frequency modulated continuous wave mode (FMCW) with a center operating frequency ranging from 1 GHz to 3000 GHz and a bandwidth that is equal to or greater than 10 GHz.

Optionally, the radar sub-system can be selected to operate in either transmit mode or receive mode.

Optionally, each of the magnetic field generators comprises a magnetic field transmitter coil and each of the magnetic field detectors comprises a magnetic field receiver coil.

Optionally, the radar sub-system comprises a plurality of transmitter radar sub-systems configured in a vertical polarization plane and a plurality of receiver radar sub-systems configured in a horizontal polarization plane. Optionally, the plurality of transmitter radar sub-systems comprises a range of 30 to 60 transmitter radar sub-systems. Optionally, the plurality of receiver radar sub-systems comprises a range of 30 to 60 receiver radar sub-systems.

Optionally, the radar sub-system is configured to operate at a wavelength of 30 mm with a corresponding center frequency of 10 GHz.

Optionally, the at least one processor is configured to implement a tensor analysis method to analyze the scan data collected from the radar arrays and the metal detector scan data.

Optionally, the radar subsystem is operated in a Stepped Frequency Continuous Wave (SFCW) mode.

The present specification also discloses a method of scanning baggage moving on the conveyor through a scanning tunnel defined by an aperture of a baggage scanning system comprising an ultra-wide band radar array and a metal detector surrounding the aperture, wherein the ultra-wide band radar array comprises a plurality of ultra-wide band radar sub-systems and the metal detector comprises a plurality of magnetic field generators and a plurality of magnetic field detectors, the method comprising: obtaining radar scan data comprising location and dielectric properties of an object in the baggage from the ultra-wide band radar arrays; obtaining metal detector scan data comprising at least one of detection, localization or characterization data of the object present in the baggage from the plurality of magnetic field detectors, wherein the object modifies the magnetic field generated by the plurality of magnetic field generators; correlating the radar scan data and the metal detector scan data for determining a location of one or more regions requiring further inspection in the baggage; and highlighting the one or more regions in an image of the baggage being scanned.

Optionally, the method further comprises one of: marking the baggage as suspicious for further manual search if one or more threat objects are present in the baggage; and clearing the baggage automatically if no threat objects are present in the baggage.

Optionally, obtaining radar scan data comprises operating the ultra-wide band radar array in a Stepped Frequency Continuous Wave mode.

Optionally, obtaining radar scan data comprises operating at least one of the plurality of ultra-wide band radar sub-systems in a transmit mode and at least one of the plurality of ultra-wide band radar sub-systems in a receive mode.

Optionally, obtaining radar scan data comprises: obtaining frequency, amplitude, and phase scan data for one or more receiver-transmitter pairs of the ultra-wide band radar sub-systems; generating a time-amplitude plot for each of the one or more transmitter-receiver pairs; and determining a calibration point and range data to each point on the surface of the baggage from the time-amplitude plot for each of the one or more transmitter-receiver pairs.

Optionally, the plurality of magnetic field generators and the plurality of magnetic field detectors are positioned at a top of the aperture and at a bottom of the aperture.

Optionally, the plurality of magnetic field generators and the plurality of magnetic field detectors are positioned below the conveyor.

Optionally, each of the plurality of magnetic field generators comprises a linear array of magnetic field transmitter coils and each of the plurality of magnetic field detectors comprises a linear array of magnetic field receiver coils.

Optionally, the plurality of ultra-wide band radar sub-systems comprises a plurality of transmitter radar sub-systems configured in a vertical polarization plane and a plurality of receiver radar sub-systems configured in a horizontal polarization plane. Optionally, the plurality of transmitter radar sub-systems comprises a range of 30 to 60 transmitter radar sub-systems. Optionally, the plurality of receiver radar sub-systems comprises a range of 30 to 60 receiver radar sub-systems. Optionally, the plurality of ultra-wide band radar sub-systems is configured to operate at a wavelength of 30 mm with a corresponding center frequency of 10 GHz.

The present specification also discloses a baggage scanning system comprising: an aperture defining a scanning tunnel; a conveyor moving through the scanning tunnel, a baggage being scanned moving on the conveyor; a UWB radar array surrounding the aperture for providing radar scan data corresponding to the baggage; a metal detector positioned at a location around the baggage allowing obtaining of metal detector scan data corresponding to the baggage; and at least a processor for correlating the radar scan data and the metal detector scan data for providing one or more suspicious regions highlighted over a video image of the baggage being scanned.

Optionally, the UWB radar array comprises a plurality of UWB radar sub-systems. Optionally, the UWB radar sub-systems are operated in a Stepped Frequency Continuous Wave (SFCW) mode. Optionally, at least one of the UWB radar sub-systems is operated in a transmit mode and at least one of the UWB radar sub-systems is operated in a receive mode.

Optionally, the radar scan data comprises location and dielectric properties of a threat object in the baggage.

Optionally, the metal detector comprises a plurality of magnetic field generators and magnetic field detectors positioned at least on two opposing sides of the aperture. Optionally, each of the magnetic field generators comprises a linear array of magnetic field transmitter coils and each of the magnetic field detectors comprises a linear array of magnetic field receiver coils. Optionally, the linear arrays of magnetic field generators and transmitter coils are positioned on the top and bottom of the aperture. Optionally, the linear arrays of magnetic field generators and transmitter coils are positioned below the conveyor.

Optionally, the metal detector scan data comprises detection, localization and characterization data of objects present in the baggage.

The present specification also discloses a baggage scanning system comprising: an aperture defining a scanning tunnel; a conveyor moving through the scanning tunnel, a baggage being scanned moving on the conveyor; an Ultra-Wide Band (UWB) radar array surrounding the aperture, the UWB radar array comprising a plurality of UWB radar sub-systems for providing radar scan data comprising location and dielectric properties of a threat object in the baggage; an X-ray detection system comprising at least a first and a second X-ray sources, wherein the X-ray sources are positioned in the scanning tunnel to project X-ray beams in up-shooter and side-shooter configurations; and at least a processor for correlating the radar scan data and the X-ray detection data for providing one or more suspicious regions highlighted over a video image of the baggage being scanned.

Optionally, the UWB radar sub-system comprises at least a Vivaldi antenna coupled with an electronics drive circuit.

Optionally, the UWB radar sub-system is operated in frequency modulated continuous wave mode (FMCW) with a 10 GHz bandwidth and operating frequency ranging from 5 GHz to 15 GHz.

Optionally, the UWB radar sub-system can be selected to operate in either transmit mode or receive mode.

The present specification also discloses a baggage scanning system comprising: an aperture defining a scanning tunnel; a conveyor moving through the scanning tunnel, a baggage being scanned moving on the conveyor; a UWB radar array surrounding the aperture, the UWB radar array comprising a plurality of UWB radar sub-systems for providing radar scan data comprising location and dielectric properties of a threat object in the baggage; a metal detection system comprising: at least a plurality of magnetic field generators and a plurality of magnetic field detectors positioned respectively at least on two opposing sides of the aperture; and a processor for enabling generation of a magnetic field via the magnetic field generators and measuring the magnetic field modified by the baggage by using the magnetic field detectors, for obtaining metal detector scan data; and at least a processor for correlating the radar scan data and the metal detector scan data for providing one or more suspicious regions highlighted over a video image of the baggage being scanned.

Optionally, the aperture is 640 mm wide and 420 mm high.

Optionally, a length of the scanning tunnel is 1200 mm.

Optionally, the metal detector scan data comprises localization and characterization data of objects present in the baggage.

Optionally, the plurality of magnetic field generators and the plurality of magnetic field detectors are positioned on the top and bottom of the aperture.

Optionally, the plurality of magnetic field generators and the plurality of magnetic field detectors are positioned below the conveyor.

Optionally, the UWB radar sub-system comprises at least a Vivaldi antenna coupled with an electronics drive circuit.

Optionally, the UWB radar sub-system is operated in frequency modulated continuous wave mode (FMCW) with a 10 GHz bandwidth and operating frequency ranging from 5 GHz to 15 GHz.

Optionally, the UWB radar sub-system can be selected to operate in either transmit mode or receive mode.

Optionally, each of the magnetic field generators comprises a magnetic field transmitter coil and each of the magnetic field detectors comprises a magnetic field receiver coil.

Optionally, the UWB radar sub-system comprises 44 transmitter UWB radar sub-systems configured in a vertical polarization plane and 40 receiver UWB radar sub-systems configured in a horizontal polarization plane, UWB radar sub-system operating at a wavelength of 30 mm with a corresponding center frequency of 10 GHz.

Optionally, the scan data collected from the UWB radar arrays and the metal detector scan data are analyzed by using tensor analysis method.

Optionally, the UWB radar subsystem is operated in a Stepped Frequency Continuous Wave (SFCW) mode.

The present specification also discloses a method of scanning baggage moving on the conveyor through a scanning tunnel defined by an aperture of a baggage scanning system comprising: a UWB radar array and a metal detector surrounding the aperture, the UWB radar array comprising a plurality of UWB radar sub-systems, the metal detector comprising a plurality of magnetic field generators and a plurality of magnetic field detectors, the method comprising: obtaining radar scan data comprising location and dielectric properties of a threat object in the baggage from the UWB radar arrays; obtaining metal detector scan data comprising detection, localization and characterization data of objects present in the baggage from the magnetic field detectors, the objects modifying the magnetic field generated by the magnetic field generators; and correlating the radar scan data and the metal detector scan data for providing one or more suspicious regions highlighted over a video image of the baggage being scanned.

Optionally the method further comprises one of: marking the baggage as suspicious for further manual search if one or more threat objects are present in the baggage; and clearing the baggage automatically if no threat objects are present in the baggage.

Optionally, the step of obtaining radar scan data comprises operating the UWB radar subsystem in a Stepped Frequency Continuous Wave (SFCW) mode.

Optionally, the step of obtaining radar scan data comprises operating at least one of the UWB radar sub-systems in a transmit mode and at least one of the UWB radar sub-systems in a receive mode.

Optionally, the step of obtaining radar scan data comprises: obtaining frequency/amplitude/phase scan data for each receiver-transmitter pair of a UWB radar sub-system; obtaining a time-amplitude plot for each transmitter-receiver pair by using a standard transformation on the obtained frequency/amplitude/phase scan data; and determining a calibration point and range data to each point on the surface of the baggage from the time-amplitude plot for each transmitter-receiver pair.

Optionally, the plurality of magnetic field generators and the plurality of magnetic field detectors are positioned on the top and bottom of the aperture.

Optionally, the plurality of magnetic field generators and the plurality of magnetic field detectors are positioned below the conveyor.

Optionally, each of the magnetic field generators comprises a linear array of magnetic field transmitter coil and each of the magnetic field detectors comprises a linear array of magnetic field receiver coil.

Optionally, the UWB radar sub-system comprises 44 transmitter UWB radar sub-systems configured in a vertical polarization plane and 40 receiver UWB radar sub-systems configured in a horizontal polarization plane, UWB radar sub-system operating at a wavelength of 30 mm with a corresponding center frequency of 10 GHz.

The present specification also discloses a baggage scanning system comprising: an aperture defining a scanning tunnel; a conveyor moving through the scanning tunnel, a baggage being scanned moving on the conveyor; a UWB radar array surrounding the aperture for providing radar scan data corresponding to the baggage; a metal detector positioned at a location around the baggage allowing obtaining of metal detector scan data corresponding to the baggage; and at least a processor for correlating the radar scan data and the metal detector scan data for providing one or more suspicious regions highlighted over a video image of the baggage being scanned.

Optionally, the UWB radar array comprises a plurality of UWB radar sub-systems. The UWB radar subsystems may be operated in a Stepped Frequency Continuous Wave (SFCW) mode. Optionally, at least one of the UWB radar sub-systems may be operated in a transmit mode and at least one of the UWB radar sub-systems may be operated in a receive mode.

Optionally, the radar scan data comprises location and dielectric properties of a threat object in the baggage.

Optionally, the metal detector comprises a plurality of magnetic field generators and magnetic field detectors positioned at least on two opposing sides of the aperture. Each of the magnetic field generators may comprise a linear array of magnetic field transmitter coil and each of the magnetic field detectors may comprise a linear array of magnetic field receiver coil.

Optionally, the metal detector scan data comprises detection, localization and characterization data of objects present in the baggage.

Optionally, the linear arrays of magnetic field generator and transmitter coils are positioned on the top and bottom of the aperture.

Optionally, the linear arrays of magnetic field generator and transmitter coils are positioned below the conveyor.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 1C is a schematic representation of an individual UWB radar component sub-system, in accordance with an embodiment of the present specification;

FIG. 2 shows a short Gaussian-like pulse of radiofrequency power in the time domain which maps to a broad wide band pulse of radiofrequency power in the frequency domain;

FIG. 3 illustrates a plurality of scanning nodes in communication with a server through a network, in accordance with an embodiment of the present specification;

DETAILED DESCRIPTION

Figure 1A:
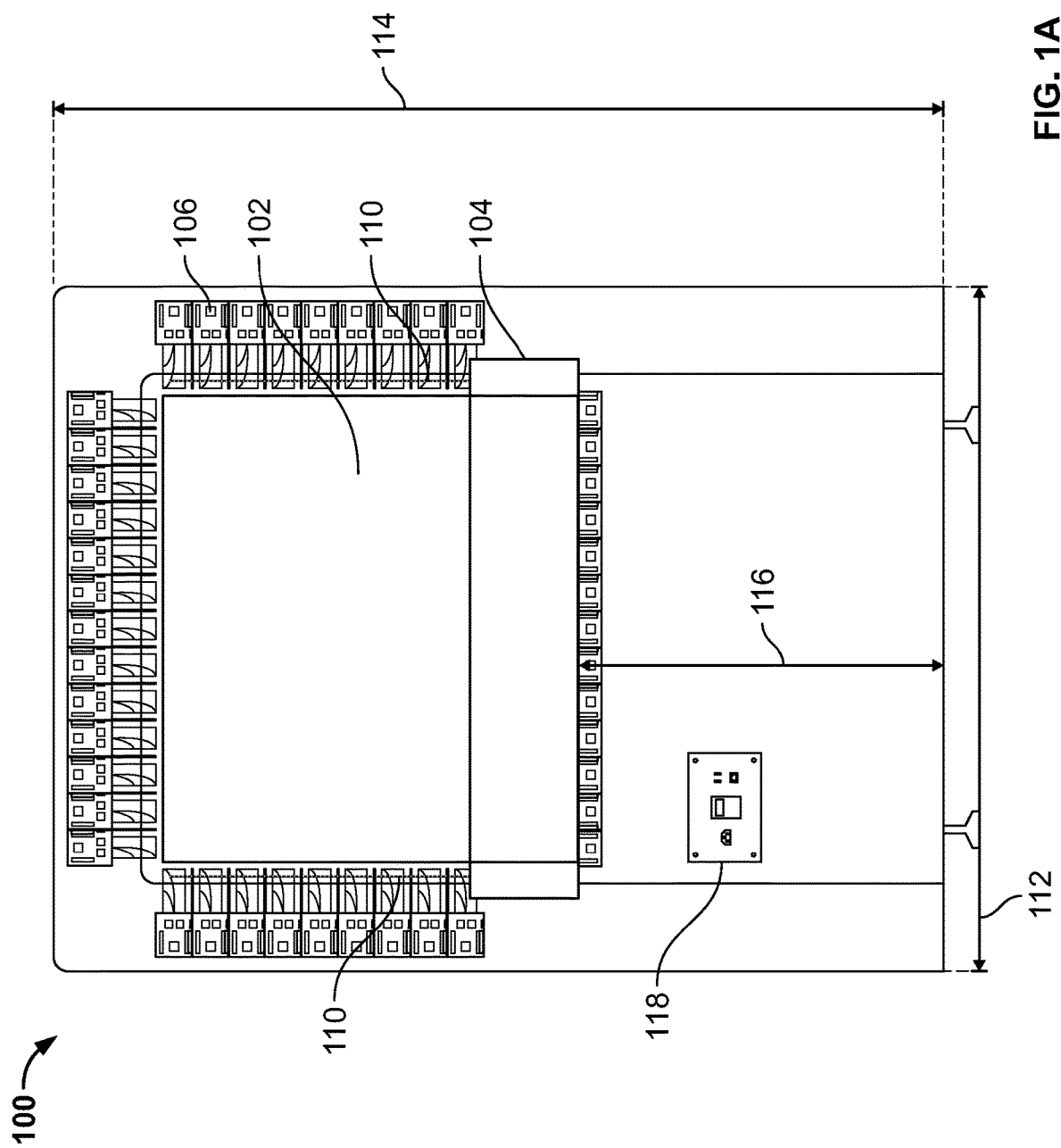
FIG. 1A illustrates a baggage scanning system comprising ultra wide band (UWB) radar sub-systems and localizing, characterizing, metal detectors (LCMD), in accordance with an embodiment of the present specification.

In embodiments, the present specification provides a baggage scanning system comprising ultra-wide band (UWB) radar inspection coupled with localizing, characterizing, metal detection (LCMD).

In embodiments, the present specification provides an X-ray baggage scanning system coupled with a radar or an ultra-wide band (UWB) radar inspection system.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

In embodiments, the baggage scanning system of the present specification comprises an ultra-wide band (UWB) radar inspection having a radar transceiver system which includes a plurality of transmitting (Tx) and receiving (Rx) antenna elements. However, in other embodiments, the baggage scanning system comprises a plurality of antenna elements, wherein each antenna element is capable of producing and transmitting electromagnetic radiation and each is capable of receiving and capturing reflected radiation. Some embodiments may include implementation of a fully integrated, FCC compliant transceiver system including a plurality of transmitter elements Tx fully integrated with an array of power amplifiers and corresponding antenna arrays to form spatial power combining and narrow beam forming; and including a plurality of receiver elements Rx fully integrated with an array of low noise amplifiers and corresponding antenna arrays to form spatial power combining from a reflected signal. Various embodiments may include implementation of an array of polarized miniature antenna elements that enable system capabilities for analysis of scanned material and differentiation and classification of scanned material according to radar signature profiles, point cloud images or radar scan information.

In some embodiments, each transceiver of the radar transceiver system may be a UWB (Ultra Wide Band) radar transceiver operating at a center frequency, for example, of about 60 GHz, with a total bandwidth that is preferably greater than 20% of the center frequency. In some embodiments, the radar transceiver system may transmit a radar signal in X-band (for example, about 8-12 gigahertz (GHz)), V-band (for example, about 40-75 gigahertz (GHz)), E-band (for example, including two bands of about 71-76 and 81-86

GHz), W-band (for example, about 75-110 GHz), or terahertz (for example, about 300-3000 GHz) frequency bands. Some embodiments may employ 5 GHz ultra wideband (UWB) radar operating at 1-6 GHz, for example, or 3-6 GHz.

In various embodiments, the transceiver system may use one or more of the aforementioned bands of frequencies. For example, some embodiments may use radiation in the X-band for low resolution, high penetration imaging and E-band for high resolution, low penetration imaging. Accordingly, the UWB radar transceiver may operate with a center frequency in a range of 1 to 3000 GHz in one or more continuous or discontinuous bands. Optionally, the UWB radar transceiver may operate with a center frequency in a range of 1 to 3000 GHz with a total bandwidth that is preferably greater than 20% of the center frequency in one or more continuous or discontinuous bands. Optionally, the UWB radar transceiver may operate with a center frequency in a range of 1 to 3000 GHz with a total bandwidth that is preferably occupies more than 500 Hz of spectrum in one or more continuous or discontinuous bands.

In embodiments, the baggage scanning system of the present specification further includes at least one processor, computer-readable medium or memory and a display. The processor includes any hardware, software, firmware, or combination thereof for controlling the radar transceiver system and processing the received electromagnetic radiation reflected from the baggage being inspected. For example, the processor may include one or more microprocessors, microcontrollers, programmable logic devices, digital signal processors or other type of processing devices that are configured to execute instructions of a computer program, and one or more memories (for example, cache memory) that store the instructions and other data used by the processor. The memory includes any type of data storage device, including but not limited to, a hard drive, random access memory (RAM), read only memory (ROM), compact disc, floppy disc, ZIP.RTM. drive, tape drive, database or other type of storage device or storage medium.

In an embodiment, the present specification provides a baggage scanning system comprising an ultra-wide band (UWB) radar inspection sub-system coupled with a metal detector. In an embodiment the metal detector is a localizing, characterizing, metal detection (LCMD) sub-system, as illustrated in FIG. 1A. In embodiments, the Radar Transceiver System provides dielectric signature information (permittivity and reflectivity) to further localize and characterize presence of a dielectric threat substance. Since scanner 100, shown in FIG. 1A, does not have X-ray detection capability no radiation-based or magnetic field-based image is shown to the system operator. However, one or more suspicious regions and/or a probable threat type, determined by either one or both of the LCMD and UWB sensors, is automatically highlighted over a video image of a bag being inspected and is presented to the system operator in real-time. In various embodiments, an automatic detection algorithm based on the radar data is used to locate and identify threat objects. The results from these automatic detection algorithms is shown on a screen to the system operator as, for example, highlighted regions over a photograph of the baggage.

In various embodiments, scanner 100 provides a low cost, zero health hazard, carry-on baggage scanning system for use with relatively untrained operators for directed search on a fraction of scanned bags, based on large potential threat items. Scanner 100 may be deployed in potentially high threat areas such as, but not limited to, critical infrastructure, special events, crowded areas such as shopping malls and the aviation sector.

As shown, scanner 100 comprises an aperture 102 defining a scanning volume through which a conveyor 104 is configured to move. In an embodiment, the conveyor 104 is comprised of plastic material that is radio-transparent. A radar array formed from multiple individual radar sub-systems 106 is located around the perimeter of aperture 102. A metal detection subsystem comprising magnetic field sensor modules 110 is located on at least two opposing sides of the aperture 102 as shown in FIG. 1A. In various embodiments, the magnetic field sensor modules comprise at least a plurality of magnetic field generators and a plurality of magnetic field detectors positioned respectively at least on two opposing sides of the aperture 102 and is coupled with a processor (not shown in FIG. 1A) for enabling generation of a magnetic field via the magnetic field generators and measuring the magnetic field modified by the baggage by using the magnetic field detectors, for obtaining metal detector scan data. The magnetic field generators and detectors comprise linear arrays of magnetic field transmitter and receiver coils respectively. In other embodiments, magnetic field sensor modules 110 may be positioned at other locations such as, but not limited to, on the top and bottom of the aperture 102, and beneath the conveyor 104.

The linear arrays of magnetic field transmitter and receiver coils are positioned so that a long edge of one coil sits at the center of the adjacent coil, such that, if the total coil width is 10 cm, the individual coils would be positioned at a spacing of 5 cm. In embodiments the height of the coils ranges between 5 cm to 15 cm. However, in alternate embodiments, the magnetic field sensor modules may be randomly or quasi-randomly spaced from one another. The magnetic field sensor arrays enable detection, localization and characterization of conductive non-ferrous metallic targets as well as ferromagnetic objects present in the baggage moving on the conveyor 104 through the aperture 102.

In various embodiments, the radar array and the magnetic field sensor modules array are concealed within a housing. In an embodiment, the aperture 102 is 640 mm wide and 420 mm high and may range from a first dimension of 400 to 800 mm by a second dimension of 300 to 600 mm and every increment therein. In an embodiment, a maximum width 112 of the unit is 940 mm with a maximum height 114 of 1250 mm from floor level and conveyor height 116 of 100 mm from floor level. In various embodiments, the width 112 is approximately 100 mm and the height 114 is approximately 1000 mm above floor level. An interconnect panel 118 is provided on the body of scanner 100 for at least, but not limited to, the following connections: input power, a circuit breaker, USB data storage and an Ethernet connection.

Figure 1B:
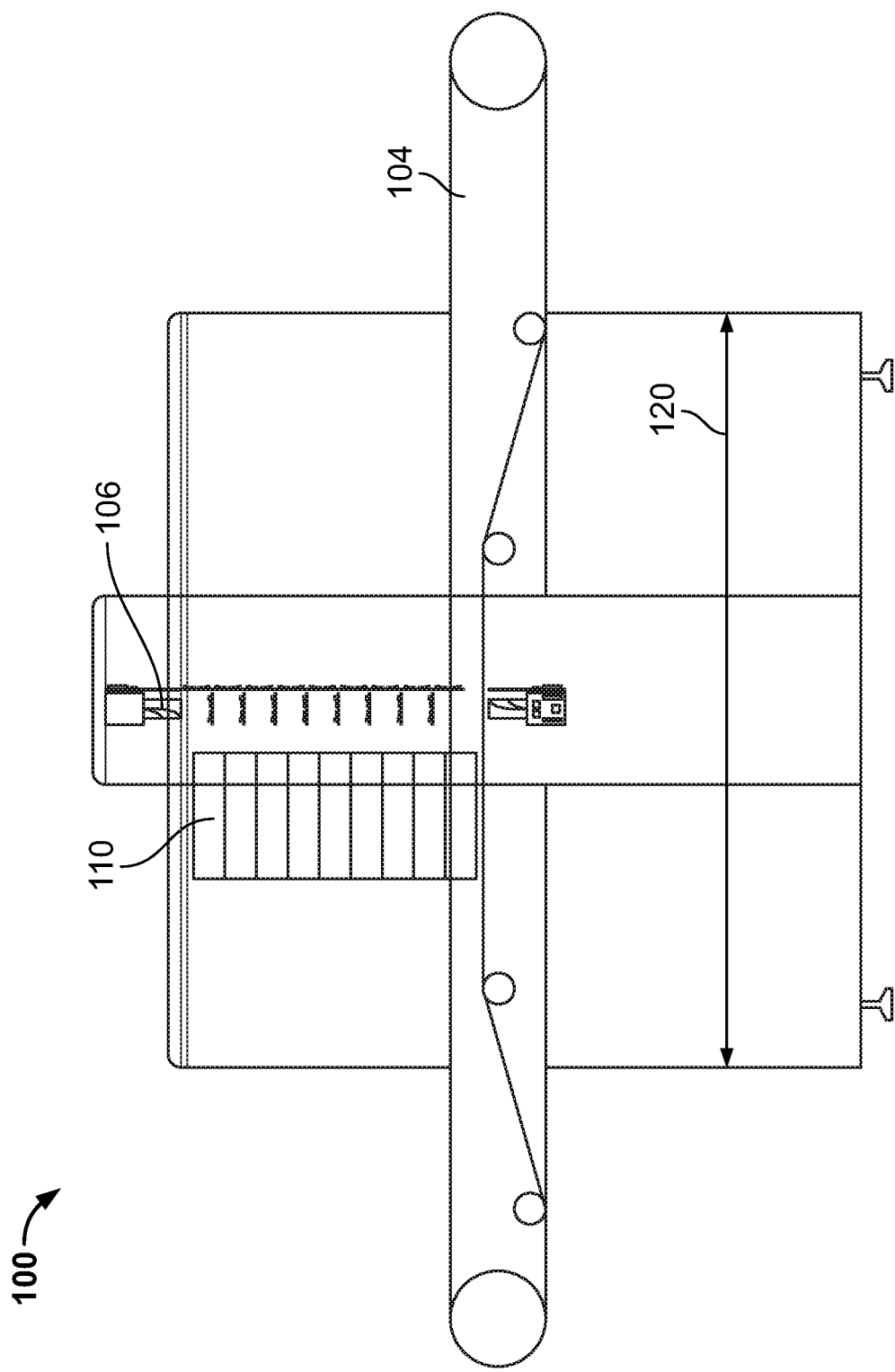
FIG. 1B is a side-view depiction of the baggage scanning system shown in FIG. 1A, in accordance with an embodiment of the present specification.

FIG. 1B illustrates a side view of the baggage scanning system 100 comprising both a UWB radar sub-system and a localizing, characterizing, metal detectors (LCMD) sub-system, shown in FIG. 1A, in accordance with an embodiment of the present specification. Referring to FIGS. 1A and 1B, scanner 100 comprises a scanning tunnel (not visible in FIG. 1A, 1B) defined by the aperture 102. In an embodiment, a length 120 of the scanning tunnel is 1200 mm. In an embodiment, a length of the conveyor 104 on either side of the tunnel is 400 mm to facilitate bag positioning on the conveyor 104, making a total system length of 2000 mm. In an embodiment, the length of conveyor 104 is approximately 1200 mm.

In an embodiment, baggage being scanned is kept on the conveyor 104 and moves at a scanning speed of 250 mm/s. In an embodiment, the scanning speed ranges from 0.1 m/s to 0.5 m/s. The baggage passes through an imaging plane, and a three-dimensional radar scan of the baggage is collected via the radar array in real time. The radar data is analyzed for the presence of threat materials. In parallel, a set magnetic field data is collected via the magnetic field sensor arrays and this data is also analyzed for threat and innocuous items. In an embodiment, the baggage being scanned is either marked as suspicious for further manual search or is cleared automatically.

In various embodiments, no actual radar-based or magnetic field-based scanning image is shown to an operator operating the scanner 100. However, a suspicious region and probable threat type determined by either one or both of the sensors is highlighted automatically over a video image of the baggage that is also presented in real-time to the operator.

FIG. 1C is a diagrammatic representation of UWB radar sub-system, in accordance with an embodiment of the present specification. The UWB radar subsystem 106 comprises a Vivaldi antenna 130 on a first side and an electronics drive circuit 140 on a second side. In an embodiment, the radar sub-system 106 is operated in frequency modulated continuous wave mode (FMCW) with a 10 GHz bandwidth and operating frequency ranging from 5 GHz to 15 GHz. In an embodiment, the scan sequence is designed to capture 50 scans per second, each scan corresponding to approximately 250/50=5 mm width of a bag under inspection.

Figure 1D:
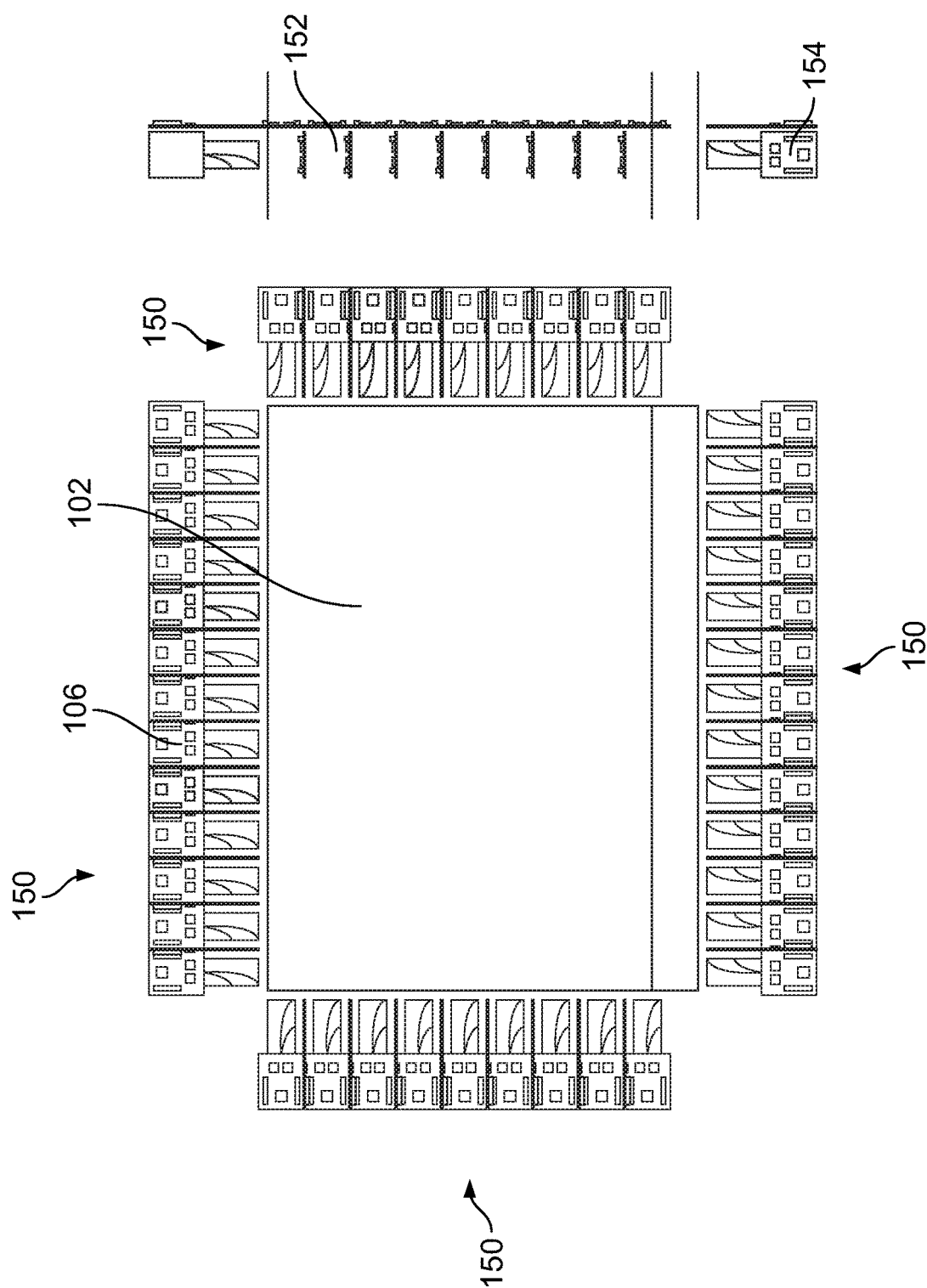
FIG. 1D is a diagram representative of an exemplary layout of a UWB radar array, in accordance with an embodiment of the present specification.

In an embodiment, as shown in FIG. 1A, the radar array is constructed from a set of individual UWB radar sub-systems/cards 106 that can be selected to operate in either transmit mode or receive mode. FIG. 1D is a diagram representative of an exemplary layout of a UWB radar array 150, in accordance with an embodiment of the present specification. Referring to FIGS. 1A, 1B, 1C and 1D simultaneously, the radar array 150 formed from multiple individual radar sub-systems 106 surrounds the aperture 102, and comprises forty-four (44) transmitters 152 (configured in a vertical polarization plane) and 40 receiver cards 154 (configured in a horizontal polarization plane) operating at a wavelength of 30 mm with a corresponding center frequency of 10 GHz. In an embodiment, a 90 degree polarization angle is maintained between the transmitter and receiver cards. As shown in FIG. 1D, the receivers and transmitters are each placed on 2λ centers (60 mm), offset such that the mean transceiver spacing is one wavelength (30 mm). In an embodiment, the transmitters are spaced at a distance that is twice the wavelength at a center frequency which may be approximately 10 GHz. In various embodiments, the number of transmitters employed is directly proportional to sampling quality of the scan data set obtained. In an embodiment, the scan data collected from the UWB radar arrays and the magnetic field sensor arrays are analyzed by using tensor analysis methods. In order to determine 3D shape information from the scan data set, various inverse problem solution techniques are adopted. For example, the scan data is arranged in matrix form for standard numerical matrix inversion. Alternatively, constrained iterative solver techniques may be employed which are generally more computationally efficient than basic matrix inversion.

In order to constrain the solver or matrix inversion problem, it is efficient to provide the algorithm with the three-dimensional shape of the baggage under inspection. This is efficiently achieved by using a video camera system in which a grid of infra-red beams is projected onto the surface of the baggage as it passes through the scanning/imaging system of the present specification and from the distortion of these beams which are observed by the video camera, a surface profile can be determined. Other mechanisms are known to those skilled in the art, such as projecting divergent infra-red pencil beams onto the baggage surface and measuring the distance between interacting spots from these beams.

The baggage is then described in terms of a suitable coordinate system, such as a 3D Cartesian matrix. Alternative systems, such as cylindrical coordinates, can also be useful.

Taking into account phase and frequency information, as well as spatial information, the tensor properties or dielectric signatures (such as the dielectric constant, conductivity, permittivity, permeability and/or reflectivity) of the baggage under inspection are determined. In embodiments, all properties of the items, which are real and imaginary components of the magnetic field may be determined. The tensor characteristics are different for every type of object, observed from different axes of symmetry. For example, a gun has two axes of symmetry, a knife has only one axis of symmetry, and a coin is a flat object with no axes of symmetry. In case of two objects, such as a knife and a gun lying close to each other, in an embodiment, the nearest neighbor in the library of tensor values is identified for characterizing the objects. In an embodiment, an alarm is generated based on one or more parameters, such as the location/position and/or the dielectric signature or said tensor properties, as the characteristic data for the baggage.

A classification method is applied to the characteristic data for this purpose. The classification method is used to determine the significance of the threat (whether the object is innocuous, benign, explosive, weapon, Improvised Explosive Device) and the category or type of the threat (mobile phone, passport, explosive material, and/or knife). Classification techniques that use tensor values, known to persons of ordinary skill in the art, may be used to determine the threat nature of the measured set of tensor properties/dielectric signatures and the residual error between the model and measurements can also be used to provide a confidence parameter on the classification.

In an embodiment, the scan data obtained from the UWB system is analyzed to determine the radar wavelength cross section of the various objects covered by the radar beam being used to scan a baggage item. In various embodiments, a complex object, such as an IED, is likely to be a mixture of dielectric material and metallic fragments and so have a very complex radar signature (such as the dielectric constant, conductivity, permittivity, permeability and/or reflectivity) and an associated tensor value. A simple dielectric material, such as a bottle of water or liquid explosive precursor, will have a less complex radar signature.

In various embodiments, by operating in the UWB frequency range, the radar wavelengths are of the same order of magnitude as the size of common threat objects (5 GHz=60 mm, 15 GHz=20 mm) and this ensure that at particular frequencies strong coupling will occur, and this information is used to determine material permittivity. In an embodiment, an image reconstruction algorithm is used for determining a size of each threat object (which depends on the frequency at which the radiation couples). The reconstruction algorithm then determines the slowing down of the radar signal which depends on the permittivity of a threat object, and uses a combination of these two effects measured from all directions for calculating both size and permittivity of the threat object. This information is used, along with the tensor data, to determine the material type under inspection (e.g. H2O or H2O2).

In an embodiment, the UWB radar subsystem is operated in a Stepped Frequency Continuous Wave (SFCW) mode. In radar-based microwave imaging, wideband pulses are synthetically created using a stepped frequency continuous wave (SFCW) varying over the entire wideband frequency range.

FIG. 2 shows a short Gaussian like pulse 205 of radiofrequency power in the time domain (left hand side) which maps to a broad wide band pulse 210 of radiofrequency power in the frequency domain (right hand side), of typical duration less than 1 ns. In frequency space, the pulse equates to a wide Gaussian extending out to many GHz in cut-off frequency. This stimulating pulse 205, when applied to a suitable antenna with broad frequency response, provides an ultra-wide band microwave beam (for use in the scanning/imaging system of the present specification) which interacts with the baggage being inspected. Since the pulse 205 is very narrow, the receiving antenna detects the arrival of the interacted beam pulse some time, 'delta t', later due to the time of flight of the pulse which travels at the speed of light ($3 \times 10^8$ m/s in vacuum).

Since the velocity of propagation of a transmitted electromagnetic beam through a threat object is dependent on its dielectric property (the velocity of propagation is slowed as it passes through the object), the surface of the baggage appears to be indented behind the object in direct proportion to the relative permittivity/dielectric property of the threat object. This information is used in reconstructing the threat location, shape, size and type in subsequent signal analysis procedures. In accordance with an embodiment, a projection of ultra wide band radio frequencies from each transmitter element to the array of detection/receiver elements allows the physical location and dimensions of a potential threat object located in a pocket or on the surface of the body of the person to be determined using simple ray tracing methods known to persons of ordinary skill in the art. Alternately, in the frequency domain, it is known to persons skilled in the art that the strongest interaction of a radio frequency signal with a dielectric object occurs at an integer divisor of the wavelength of the electromagnetic beam. Therefore, in one embodiment, the dimension of an object is determined by spectral analysis of the reflected electromagnetic beam— wherein a plurality of notches due to object attenuation is characteristic of the dimensions of the object.

In accordance with various aspects, a plurality of radar based scanning and imaging systems, are networked together for communication through a centralized processing or server system.

FIG. 3 illustrates a plurality of scanning nodes 305 in communication with a master or centralized server or processing system 310 through a network 315, which may be a private secured network or a secured Cloud-based network, for example. In embodiments, scan data as well as alarm, threat or no-threat decisions from the plurality of scanning nodes 305 are communicated, stored and analyzed at the processing system 310. Networking of the scanning nodes 305 enables various advantages such as: ability to track a baggage through multiple scanning zones of the nodes 305 to (a) confirm the presence of a threat or otherwise clear an alarm, and (b) review potential threats against an evolving normal, innocuous, benign or no-threat data set from all the other scan data that has been collected from other scanning nodes. This enables implementation of deep learning algorithms to provide a second opinion on the threat result from an individual alarming scanning node.

Figure 4A:
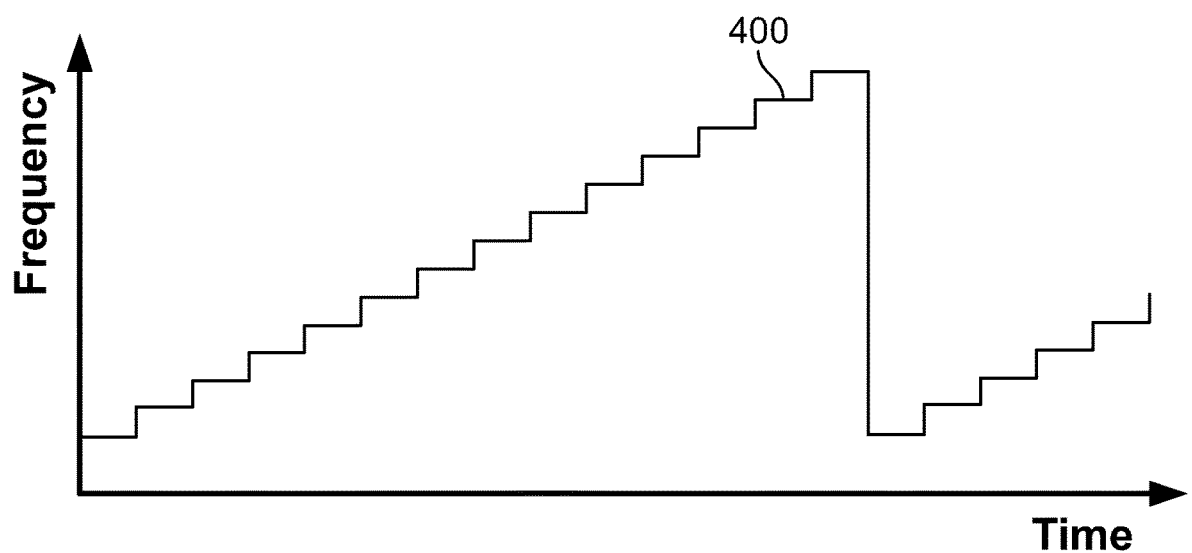
FIG. 4A illustrates an exemplary frequency vs. time chart for a Stepped Frequency Continuous Wave (SFCW) radar system, in accordance with an embodiment of the present specification.

FIG. 4A illustrates an exemplary frequency vs time graph for a SFCW radar system, in accordance with an embodiment of the present specification. Graph 400 shows frequency/time steps corresponding to incrementing frequency instances wherein, the duration of each frequency step is 2.25 microseconds with 0.05 GHz frequency increments, resulting in a scan rate of 50 Hz and equivalent inspection slice width of 5 mm. In an embodiment, the frequency increments may range from .01 to .05 GHz. In various embodiments, at the end of each frequency scan, the system is reset back to the base frequency creating a "sawtooth-like" waveform as shown in FIG. 4A.

Figure 4B:
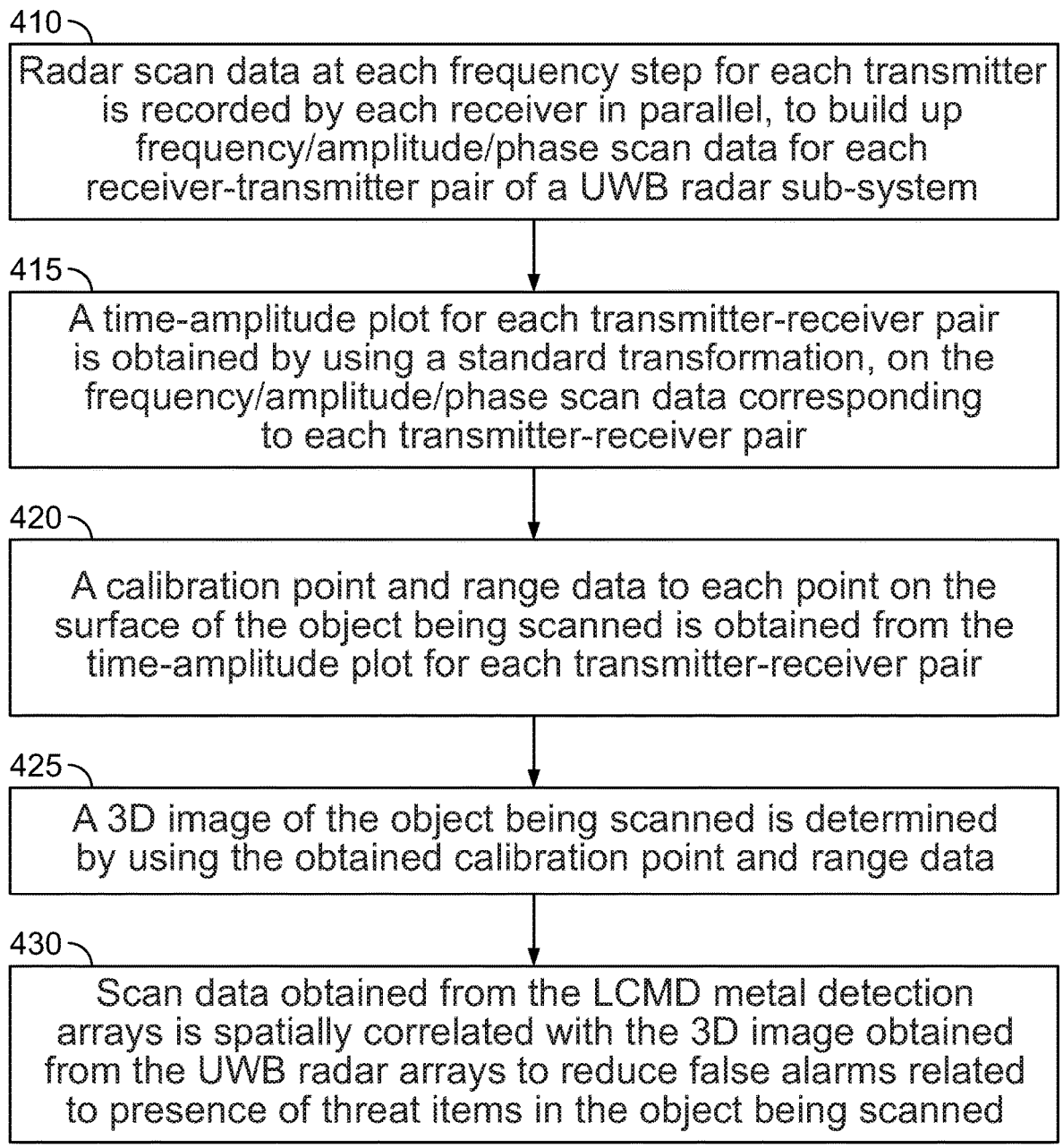
FIG. 4B is a flowchart describing a method for obtaining a 3D image of an object being inspected by using the baggage scanning system shown in FIG. 1A, in accordance with an embodiment of the present specification.

FIG. 4B is a flowchart describing a method for obtaining a 3D image of an object being inspected by using the baggage scanning system shown in FIG. 1A, in accordance with an embodiment of the present specification. Referring to FIGS. 4A and 4B, at step 410, radar scan data at each frequency step for each transmitter (of the UWB radar array 150 shown in FIG. 1D) is recorded by each receiver in parallel, to build up frequency/amplitude/phase scan data for each receiver-transmitter pair of a UWB radar sub-system. At step 415, a time-amplitude plot for each transmitter-receiver pair is obtained by using a standard transformation, such as but not limited to, Fourier transform on the frequency/amplitude/phase scan data corresponding to each transmitter-receiver pair. At step 420 a calibration point (the time taken for the direct radar signal to reach each receiver from the transmitter) and range data to each point on the surface of the object being scanned is obtained from the time-amplitude plot for each transmitter-receiver pair. In an embodiment, the range data provides information regarding the location of a split on the surface of an object, which further enables identification of the location and size of each object in a baggage being scanned. The range data may be observed as a peak at a particular time in a time-amplitude plot.

At step 425 a 3D image of the object being scanned is determined by using the obtained calibration point and range data. In an embodiment, a range map using the UWB data recorded at each receiver from each transmitter at each frequency is constructed by using any back projection algorithm. It is known that, for a radar system, range resolution=(c/2.B) where 'c' denotes the speed of light and 'B' denotes bandwidth. In an embodiment, by using a UWB radar sub-system having a 10 GHz bandwidth, a 15 mm range resolution may be obtained. In an embodiment, the range data is oversampled by using multiple transmitters and multiple receivers. Hence, the net range error is less than 15 mm, and in an embodiment is 5 mm, resulting in a 5 mm×5 mm×5 mm voxel dimensions in the tomographic like 3D radar surface image. This allows determining the volume of any object, its 3D location within the inspection tunnel, and its dielectric and tensor properties. At step 430 scan data obtained from the metal detection magnetic field sensor arrays is spatially correlated with the 3D image obtained from the UWB radar arrays to reduce false alarms related to presence of threat items in the object being scanned. In an embodiment, metallic objects from the LCMD sub-system are locatable to approximately 10 mm accuracy and dielectric objects from the radar sub-system are locatable to approximately 5 mm accuracy. Hence, the two sets of data can be spatially co-related.

In accordance with another aspect, the non-ionizing radiation based scanning and imaging system 100 (FIG. 1A) of the present specification is integrated with an X-ray baggage scanner system that in some embodiments may be a dual view baggage scanner system.

Figure 5:
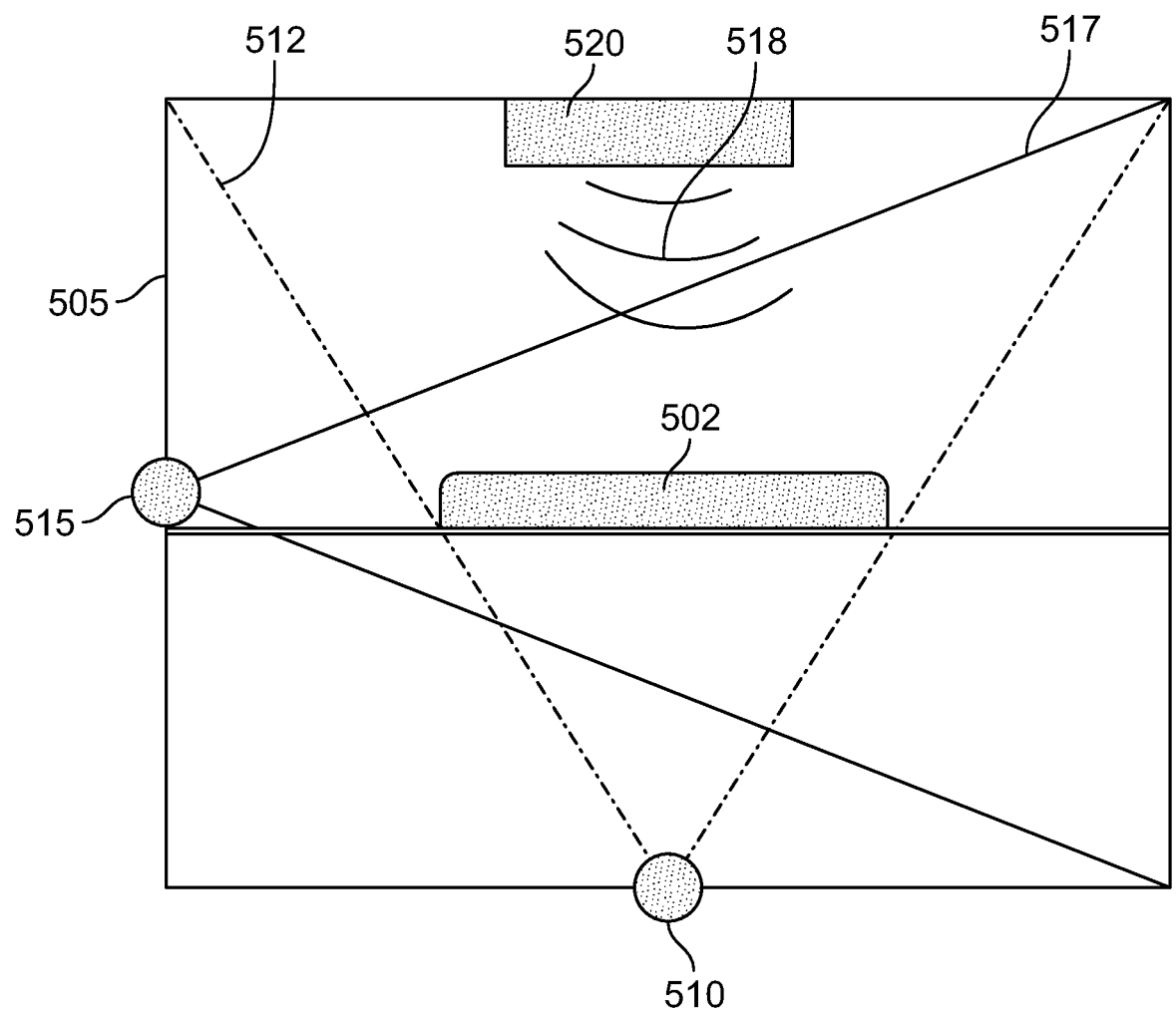
FIG. 5 illustrates a cross-sectional view of an inspection tunnel of an integrated X-ray baggage scanner and radar based scanning system, in accordance with an embodiment of the present specification.

FIG. 5 illustrates a cross-sectional view of an inspection tunnel 505 of an integrated X-ray baggage scanner and radar based scanning system (system 100 of FIG. 1A) wherein an object 502, such as a laptop for example, is being conveyed through the tunnel 505 for scanning. In some embodiments, first and second X-ray sources 510, 515 are positioned in the tunnel 505 to project X-ray beams 512, 517 in up-shooter and side-shooter configurations, respectively. The tunnel 505 also includes a radar transceiver system 520 similar to the system 120 of FIG. 1A to propagate non-ionizing electromagnetic radiation 518 downwards towards the object 502 being conveyed.

Embodiments of the figure, in accordance with the present specification, provide an ability to detect both dimensionality, through X-ray detection, and a combination of reflectivity, permittivity, and dielectric, through radar detection. During operation, the X-ray scan data enables determination of dimensions and radiographic images (from dual views) of suspicious items concealed within the object 502. The side-shooter configuration also enables determination of a thickness of items within the object 502 apart from revealing radiographic information. For example, X-ray scanning of a laptop may reveal two separate areas in the battery compartment of the laptop, thereby raising a red flag. In such a scenario, dielectric signature information (such as permittivity and reflectivity) generated using the radar transceiver system 520 is utilized to further localize and characterize presence of a dielectric threat substance, such as a liquid and/or plastic based explosive for example, is concealed in the battery compartment.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A scanning system adapted to inspect baggage, comprising:
   an aperture defining a scanning tunnel;
   a conveyor configured to move the baggage through the scanning tunnel;
   a radar array distributed around the aperture, the radar array comprising a plurality of radar sub-systems configured to provide radar scan data, wherein the radar scan data comprises location and dielectric properties of a threat object in the baggage;
   a metal detection system comprising:
      a plurality of magnetic field generators positioned on a first side of the aperture;
      a plurality of magnetic field detectors positioned on a second side of the aperture, wherein the second side opposes the first side; and
      a processor configured to cause a magnetic field to be generated in the aperture using at least some of the plurality of magnetic field generators, configured to receive data from at least some of the plurality of magnetic field detectors, and configured to generate metal detector scan data, wherein the metal detector scan data comprises values indicative of a magnetic field modified by the baggage passing through the aperture; and
   at least one processor configured to correlate the radar scan data and the metal detector scan data and to determine one or more regions of the baggage requiring further inspection.

2. The scanning system of claim 1, further comprising a video camera system positioned within the aperture and configured to generate surface profile data of the baggage.

3. The scanning system of claim 2, wherein the at least one processor is configured to use the surface profile data, radar scan data and metal detector scan data to highlight the one or more regions in an image of the baggage.

4. The scanning system of claim 1 wherein, the metal detector scan data comprises localization and characterization data of objects present in the baggage.

5. The scanning system of claim 1 wherein at least a portion of the plurality of magnetic field generators are positioned on a top of the aperture and at least a portion of the plurality of magnetic field detectors are positioned on a bottom of the aperture.

6. The scanning system of claim 1 wherein the plurality of magnetic field generators and the plurality of magnetic field detectors are positioned below the conveyor.

7. The scanning system of claim 1 wherein at least one of the plurality of radar sub-systems comprises at least one narrow beam forming antenna or at least one polarized antenna coupled with an electronics drive circuit.

8. The scanning system of claim 1 wherein at least one of the plurality of radar sub-systems is operated in frequency modulated continuous wave mode (FMCW) with a center operating frequency ranging from 1 GHz to 3000 GHz and a bandwidth that is equal to or greater than 10 GHz.

9. The scanning system of claim 1 wherein at least one of the plurality of radar sub-systems can be selected to operate in either transmit mode or receive mode.

10. The scanning system of claim 1 wherein each of the plurality of magnetic field generators comprises a magnetic field transmitter coil and each of the plurality of magnetic field detectors comprises a magnetic field receiver coil.

11. The scanning system of claim 1 wherein the plurality of radar sub-systems comprise a plurality of transmitter radar sub-systems configured in a vertical polarization plane and a plurality of receiver radar sub-systems configured in a horizontal polarization plane.

12. The scanning system of claim 11 wherein the plurality of transmitter radar sub-systems comprises a number of transmitter radar sub-systems in a range of 30 to 60.

13. The scanning system of claim 11 wherein the plurality of receiver radar sub-systems comprises a number of receiver radar sub-systems in a range of 30 to 60.

14. The scanning system of claim 1, wherein at least one of the plurality of radar sub-systems is configured to operate at a wavelength of 30 mm with a corresponding center frequency of 10 GHz.

15. The scanning system of claim 1 wherein the at least one processor is configured to implement a tensor analysis method to analyze the radar scan data and the metal detector scan data.

16. The scanning system of claim 1 wherein at least one of the plurality of radar sub-systems is operated in a Stepped Frequency Continuous Wave (SFCW) mode.

17. A method of scanning baggage moving on a conveyor positioned within, and extending through, a scanning tunnel defined by an aperture of a baggage scanning system, wherein the baggage scanning system comprises an ultra-wide band radar array and a metal detector positioned proximate the aperture, wherein the ultra-wide band radar array comprises a plurality of ultra-wide band radar sub-systems and wherein the metal detector comprises a plurality of magnetic field generators and a plurality of magnetic field detectors, the method comprising:

obtaining radar scan data comprising location and dielectric properties of an object in the baggage from the ultra-wide band radar arrays;

obtaining metal detector scan data comprising at least one of detection, localization or characterization data of the object present in the baggage from the metal detector;

correlating the radar scan data and the metal detector scan data for determining a location of one or more regions requiring further inspection in the baggage;

generating a visual image of the baggage; and highlighting the one or more regions in said visual image.

18. The method of scanning baggage of claim 17 wherein obtaining radar scan data comprises operating the ultra-wide band radar array in a Stepped Frequency Continuous Wave mode.

19. The method of scanning baggage of claim 17 wherein obtaining radar scan data comprises operating at least one of the plurality of ultra-wide band radar sub-systems in a transmit mode and at least one of the plurality of ultra-wide band radar sub-systems in a receive mode.

20. The method of scanning baggage of claim 17 wherein obtaining radar scan data comprises:

obtaining frequency, amplitude, and phase scan data for one or more receiver-transmitter pairs of the ultra-wide band radar sub-systems;

generating a time-amplitude plot for each of the one or more transmitter-receiver pairs; and determining a calibration point and range data to each point on a surface of the baggage from the time-amplitude plot for each of the one or more transmitter-receiver pairs.

21. The method of scanning baggage of claim 17, wherein at least some of the plurality of magnetic field generators are positioned at a top of the aperture and at least some of the plurality of magnetic field detectors are positioned at a bottom of the aperture.

22. The method of scanning baggage of claim 17 wherein the plurality of magnetic field generators and the plurality of magnetic field detectors are positioned below the conveyor.

23. The method of scanning baggage of claim 17 wherein each of the plurality of magnetic field generators comprises a linear array of magnetic field transmitter coils and each of the plurality of magnetic field detectors comprises a linear array of magnetic field receiver coils.

24. The method of scanning baggage of claim 17 wherein the plurality of ultra-wide band radar sub-systems comprises a plurality of transmitter radar sub-systems configured in a vertical polarization plane and a plurality of receiver radar sub-systems configured in a horizontal polarization plane.

25. The method of scanning baggage of claim 24 wherein the plurality of transmitter radar sub-systems comprises a number of transmitter radar sub-systems in a range of 30 to 60.

26. The method of scanning baggage of claim 24 wherein the plurality of receiver radar sub-systems comprises a number of receiver radar sub-systems in a range of 30 to 60.

27. The method of scanning baggage of claim 24, wherein the plurality of ultra-wide band radar sub-systems is configured to operate at a wavelength of 30 mm with a corresponding center frequency of 10 GHz.

* * * * *